(12) United States Patent
Sun et al.

(10) Patent No.: US 7,945,492 B1
(45) Date of Patent: May 17, 2011

(54) SYSTEM AND METHOD FOR INTEGRATING TRADING OPERATIONS INCLUDING THE GENERATION, PROCESSING AND TRACKING OF AND TRADE DOCUMENTS

(75) Inventors: Albert Kwang-Hwa Sun, Brooklyn, NY (US); Tak Ming Chan, Kwun Tong (HK); Jacqueline Layer, Dorset (GB); Nicole Gabrielle Rodriguez Toulis, New York, NY (US); Stephen Pan Cheung, Tsuen Wan (HK); Patrick Shu Pui Ko, Happy Valley (HK); Sammy Shun Yuen Fung, Kowloon (HK); Thomas William Halpin, Irvington, NY (US); Yoke Bee Yap, New York, NY (US); Zeno Fook Cheun Chow, Yuen Long, N.T. (HK); Kelvin Yatsun Leung, Pelham, NY (US); Kwok Keung Yeung, Shatin (HK); Man Pui Tsim, Hong Kong (HK); Sol Solomon, Caulfield (AU)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 09/495,393

(22) Filed: Jan. 31, 2000
(Under 37 CFR 1.47)

Related U.S. Application Data

(63) Continuation of application No. PCT/US99/030976, filed on Dec. 23, 1999.

(60) Provisional application No. 60/113,643, filed on Dec. 23, 1998, provisional application No. 60/113,561, filed on Dec. 23, 1998.

(51) Int. Cl.
*G06Q 10/00* (2006.01)
*G06Q 40/00* (2006.01)

(52) U.S. Cl. ............................................. 705/35; 705/28
(58) Field of Classification Search .................... 705/28, 705/35
See application file for complete search history.

(56) References Cited

U.S. PATENT DOCUMENTS

| 1,985,592 A | 2/1933 | Woodward et al. |
| 3,653,480 A | 4/1972 | Yamamoto et al. |

(Continued)

FOREIGN PATENT DOCUMENTS

EP 0099999 7/1983

(Continued)

OTHER PUBLICATIONS

Electronic Payments International, International:Bolero . . . n 113, p. 8. Nov. 1996.*

(Continued)

*Primary Examiner* — Richard C Weisberger
(74) *Attorney, Agent, or Firm* — Hunton & Williams, LLP

(57) ABSTRACT

First and second components of the present invention, in combination, provide a customer interface for initiating a trade transaction and provides for the secure viewing of the status of the transaction. A third component assists in the automatic generation and verification of the voluminous and detailed documents required to support a trade transaction. The third component additionally tracks and assists in the management of the seller's manufacturing and shipment of the goods that form the basis of the trade transaction. A fourth component automatically generates a Letter of Credit from a Purchase Order and performs a reconciliation function on payments made pursuant to Letters of Credit or open Accounts.

24 Claims, 5 Drawing Sheets

U.S. PATENT DOCUMENTS

| | | |
|---|---|---|
| 3,938,090 A | 2/1976 | Borison et al. |
| 4,050,375 A | 9/1977 | Orleans |
| 4,141,078 A | 2/1979 | Bridges et al. |
| 4,205,780 A | 6/1980 | Burns |
| 4,223,403 A | 9/1980 | Konheim et al. |
| 4,264,808 A | 4/1981 | Owens et al. |
| 4,319,336 A | 3/1982 | Anderson et al. |
| 4,321,672 A | 3/1982 | Braun et al. |
| 4,385,285 A | 5/1983 | Horst et al. |
| 4,396,985 A | 8/1983 | Ohara |
| 4,443,027 A | 4/1984 | McNeely et al. |
| 4,453,074 A | 6/1984 | Weinstein |
| 4,454,414 A | 6/1984 | Benton |
| RE31,692 E | 10/1984 | Tyburski et al. |
| 4,495,018 A | 1/1985 | Vohrer |
| 4,575,621 A | 3/1986 | Dreifus |
| 4,605,820 A | 8/1986 | Campbell, Jr. |
| 4,605,844 A | 8/1986 | Haggan |
| 4,614,861 A | 9/1986 | Pavlov et al. |
| 4,617,457 A | 10/1986 | Myers |
| 4,621,325 A | 11/1986 | Naftzger et al. |
| 4,641,239 A | 2/1987 | Takesako |
| 4,650,981 A | 3/1987 | Foletta |
| 4,661,658 A | 4/1987 | Matyas |
| 4,669,730 A | 6/1987 | Small |
| 4,672,377 A | 6/1987 | Murphy |
| 4,694,397 A | 9/1987 | Grant et al. |
| 4,697,072 A | 9/1987 | Kawana |
| 4,700,055 A | 10/1987 | Kashkashian, Jr. |
| 4,701,601 A | 10/1987 | Francini et al. |
| 4,713,760 A | 12/1987 | Yamada et al. |
| 4,713,761 A | 12/1987 | Sharpe et al. |
| 4,752,676 A | 6/1988 | Leonard et al. |
| 4,752,877 A | 6/1988 | Roberts et al. |
| 4,797,913 A | 1/1989 | Kaplan |
| 4,799,156 A | 1/1989 | Shavit et al. |
| 4,807,177 A | 2/1989 | Ward |
| 4,812,628 A | 3/1989 | Boston |
| 4,817,949 A | 4/1989 | Bachman et al. |
| 4,823,264 A | 4/1989 | Deming |
| 4,845,347 A | 7/1989 | McCrindle |
| 4,859,837 A | 8/1989 | Halpern |
| 4,877,947 A | 10/1989 | Masu et al. |
| 4,891,503 A | 1/1990 | Jewell |
| 4,893,333 A | 1/1990 | Baran et al. |
| 4,931,793 A | 6/1990 | Fuhrmann et al. |
| 4,939,674 A | 7/1990 | Price et al. |
| 4,948,174 A | 8/1990 | Thomson et al. |
| 4,972,318 A | 11/1990 | Brown et al. |
| 4,974,878 A | 12/1990 | Josephson |
| 4,975,841 A | 12/1990 | Kehnemuyi et al. |
| 4,977,501 A | 12/1990 | Lefevre |
| 4,984,155 A | 1/1991 | Geier et al. |
| 4,988,849 A | 1/1991 | Sasaki |
| 4,992,646 A | 2/1991 | Collin |
| 4,992,940 A | 2/1991 | Dworkin |
| 5,007,084 A | 4/1991 | Materna et al. |
| 5,023,782 A | 6/1991 | Lutz et al. |
| 5,023,904 A | 6/1991 | Kaplan |
| 5,025,139 A | 6/1991 | Halliburton, Jr. |
| 5,053,607 A | 10/1991 | Carlson |
| 5,054,096 A | 10/1991 | Beizer |
| 5,072,380 A | 12/1991 | Randelman et al. |
| 5,080,748 A | 1/1992 | Bonomi |
| 5,097,115 A | 3/1992 | Ogasawara et al. |
| 5,111,395 A | 5/1992 | Smith |
| 5,117,354 A | 5/1992 | Long et al. |
| 5,121,945 A | 6/1992 | Thomson et al. |
| 5,122,950 A | 6/1992 | Mee |
| 5,136,502 A | 8/1992 | Van Remortel et al. |
| 5,173,851 A | 12/1992 | Off et al. |
| 5,175,682 A | 12/1992 | Higashiyama |
| 5,187,750 A | 2/1993 | Behera |
| 5,198,975 A | 3/1993 | Baker et al. |
| 5,204,821 A | 4/1993 | Inui et al. |
| 5,220,501 A | 6/1993 | Lawlor |
| 5,224,034 A | 6/1993 | Katz et al. |
| 5,225,978 A | 7/1993 | Peterson |
| 5,231,569 A | 7/1993 | Myatt et al. |
| 5,237,159 A | 8/1993 | Stephens |
| 5,237,620 A | 8/1993 | Deaton |
| 5,257,486 A | 11/1993 | Holmwall |
| 5,265,007 A | 11/1993 | Barnhard, Jr. et al. |
| 5,265,008 A | 11/1993 | Benton et al. |
| 5,276,311 A | 1/1994 | Hennige |
| 5,283,829 A | 2/1994 | Anderson |
| 5,287,269 A | 2/1994 | Dorrough et al. |
| 5,305,196 A | 4/1994 | Deaton et al. |
| 5,311,594 A | 5/1994 | Penzias |
| 5,315,508 A | 5/1994 | Bain et al. |
| 5,321,238 A | 6/1994 | Watanabe |
| 5,326,959 A | 7/1994 | Perazza |
| 5,326,965 A | 7/1994 | Risser |
| 5,327,508 A | 7/1994 | Deaton et al. |
| 5,336,870 A | 8/1994 | Hughes |
| 5,349,170 A | 9/1994 | Kern |
| 5,350,906 A | 9/1994 | Brody et al. |
| 5,351,187 A | 9/1994 | Hassett |
| 5,352,877 A | 10/1994 | Morley |
| 5,367,581 A | 11/1994 | VanHorn |
| 5,372,386 A | 12/1994 | Mills |
| 5,373,550 A | 12/1994 | Campbell |
| 5,382,784 A | 1/1995 | Eberhardt |
| 5,396,417 A | 3/1995 | Burks |
| 5,402,474 A | 3/1995 | Miller |
| 5,412,190 A | 5/1995 | Kopesec |
| 5,413,341 A | 5/1995 | Lieberman |
| 5,424,938 A | 6/1995 | Wagner |
| 5,428,684 A | 6/1995 | Akiyama et al. |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glasser et al. |
| 5,446,740 A | 8/1995 | Yien |
| 5,448,471 A | 9/1995 | Deaton et al. |
| 5,459,482 A | 10/1995 | Orlen |
| 5,465,206 A | 11/1995 | Hilt et al. |
| 5,477,040 A | 12/1995 | Lalonde |
| 5,479,494 A | 12/1995 | Clitherow |
| 5,481,094 A | 1/1996 | Suda |
| 5,483,445 A | 1/1996 | Pickering |
| 5,484,988 A | 1/1996 | Hills |
| 5,487,100 A | 1/1996 | Kane |
| 5,495,981 A | 3/1996 | Warther |
| 5,497,317 A | 3/1996 | Hawkins et al. |
| 5,500,890 A | 3/1996 | Rogge et al. |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | McAllister |
| 5,530,907 A | 6/1996 | Pavey et al. |
| 5,532,464 A | 7/1996 | Josephson et al. |
| 5,532,689 A | 7/1996 | Bueno |
| 5,539,825 A | 7/1996 | Akiyama et al. |
| 5,541,583 A | 7/1996 | Mandelbaum |
| 5,544,043 A | 8/1996 | Miki et al. |
| 5,544,046 A | 8/1996 | Niwa |
| 5,550,734 A | 8/1996 | Tater |
| 5,551,021 A | 8/1996 | Harada |
| 5,557,515 A | 9/1996 | Abbruzzese et al. |
| 5,557,780 A | 9/1996 | Edwards et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,590,197 A | 12/1996 | Chen |
| 5,592,377 A | 1/1997 | Lipkin |
| 5,592,378 A | 1/1997 | Cameron |
| 5,599,528 A | 2/1997 | Igaki |
| 5,602,936 A | 2/1997 | Green et al. |
| 5,603,025 A | 2/1997 | Tabb |
| 5,612,868 A | 3/1997 | Off et al. |

| | | | | | |
|---|---|---|---|---|---|
| 5,615,109 A | 3/1997 | Eder | 5,852,811 A | 12/1998 | Atkins |
| 5,617,474 A | 4/1997 | Ditzig et al. | 5,852,812 A | 12/1998 | Reeder |
| 5,619,558 A | 4/1997 | Jheeta | 5,859,419 A | 1/1999 | Wynn |
| 5,621,201 A | 4/1997 | Langhans | 5,864,609 A | 1/1999 | Cross et al. |
| 5,621,812 A | 4/1997 | Deaton et al. | 5,870,456 A | 2/1999 | Rogers |
| 5,638,457 A | 6/1997 | Deaton et al. | 5,870,721 A | 2/1999 | Norris |
| 5,640,577 A | 6/1997 | Scharmer | 5,870,723 A | 2/1999 | Pare |
| 5,642,419 A | 6/1997 | Rosen | 5,870,725 A | 2/1999 | Belinger et al. |
| 5,642,485 A | 6/1997 | Deaton et al. | 5,873,072 A | 2/1999 | Kight |
| 5,644,723 A | 7/1997 | Deaton et al. | 5,878,141 A | 3/1999 | Daly et al. |
| 5,644,778 A | 7/1997 | Burks et al. | 5,883,337 A | 3/1999 | Dolan et al. |
| 5,649,114 A | 7/1997 | Deaton et al. | 5,883,377 A | 3/1999 | Chapin, Jr. |
| 5,649,117 A | 7/1997 | Landry | 5,883,810 A | 3/1999 | Franklin et al. |
| 5,652,786 A | 7/1997 | Rogers | 5,884,288 A | 3/1999 | Chang |
| 5,659,165 A | 8/1997 | Jennings | 5,884,290 A | 3/1999 | Smorodinsky et al. |
| 5,659,469 A | 8/1997 | Deaton et al. | 5,893,080 A | 4/1999 | McGurl et al. |
| 5,659,741 A | 8/1997 | Eberhardt | 5,897,625 A | 4/1999 | Gustin |
| 5,666,493 A | 9/1997 | Wojcik et al. | 5,898,157 A | 4/1999 | Mangili et al. |
| 5,668,953 A | 9/1997 | Sloo | 5,903,881 A | 5/1999 | Schrader |
| 5,669,528 A | 9/1997 | Romero et al. | 5,907,142 A | 5/1999 | Kelsey |
| 5,677,521 A | 10/1997 | Garrou | 5,910,896 A | 6/1999 | Hahn-Carlson |
| 5,677,955 A | 10/1997 | Doggett et al. | 5,910,988 A | 6/1999 | Ballard |
| 5,679,938 A | 10/1997 | Templeton | 5,915,246 A | 6/1999 | Patterson et al. |
| 5,679,940 A | 10/1997 | Templeton | 5,917,965 A | 6/1999 | Cahill et al. |
| 5,680,459 A | 10/1997 | Hook et al. | 5,920,847 A | 7/1999 | Kolling et al. |
| 5,687,250 A | 11/1997 | Curley et al. | 5,926,745 A | 7/1999 | Threadgill et al. |
| 5,687,322 A | 11/1997 | Deaton et al. | 5,928,082 A | 7/1999 | Clapper, Jr. |
| 5,689,593 A | 11/1997 | Pan et al. | 5,930,778 A | 7/1999 | Geer |
| 5,692,132 A | 11/1997 | Hogan | 5,933,812 A | 8/1999 | Meyer et al. |
| 5,694,552 A | 12/1997 | Aharoni | 5,940,510 A | 8/1999 | Curry et al. |
| 5,698,837 A | 12/1997 | Furuta | 5,940,811 A | 8/1999 | Norris |
| 5,699,528 A | 12/1997 | Hogan | 5,940,844 A | 8/1999 | Cahill et al. |
| 5,703,344 A | 12/1997 | Bezy et al. | 5,943,656 A | 8/1999 | Crooks |
| 5,704,044 A | 12/1997 | Tarter et al. | 5,945,653 A | 8/1999 | Walker et al. |
| 5,708,422 A | 1/1998 | Blonder et al. | 5,946,662 A | 8/1999 | Ettl et al. |
| 5,710,889 A | 1/1998 | Clark et al. | 5,949,044 A | 9/1999 | Walker et al. |
| 5,715,298 A | 2/1998 | Rogers | 5,950,174 A | 9/1999 | Brendzel |
| 5,715,314 A | 2/1998 | Payne | 5,956,700 A | 9/1999 | Landry |
| 5,715,399 A | 2/1998 | Bezos | 5,960,411 A | 9/1999 | Hartman et al. |
| 5,717,868 A | 2/1998 | James | 5,963,659 A | 10/1999 | Cahill et al. |
| 5,717,989 A * | 2/1998 | Tozzoli et al. .................. 705/37 | 5,963,925 A | 10/1999 | Kolling et al. |
| 5,724,424 A | 3/1998 | Gifford | 5,966,698 A | 10/1999 | Pollin |
| 5,727,249 A | 3/1998 | Pollin | 5,970,469 A | 10/1999 | Scroggie et al. |
| 5,729,594 A | 3/1998 | Klingman | 5,970,475 A | 10/1999 | Barnes et al. |
| 5,748,780 A | 5/1998 | Stolfo | 5,978,780 A | 11/1999 | Watson |
| 5,751,842 A | 5/1998 | Eccles | 5,987,434 A | 11/1999 | Libman |
| 5,757,917 A | 5/1998 | Rose et al. | 5,987,435 A | 11/1999 | Weiss et al. |
| 5,770,843 A | 6/1998 | Rose et al. | 5,987,436 A | 11/1999 | Halbrook |
| 5,774,553 A | 6/1998 | Rosen | 5,987,439 A | 11/1999 | Gustin et al. |
| 5,774,883 A | 6/1998 | Andersen et al. | 5,991,749 A | 11/1999 | Morrill, Jr. |
| 5,783,808 A | 7/1998 | Josephson | 5,991,750 A | 11/1999 | Watson |
| 5,784,696 A | 7/1998 | Melnikof | 6,000,832 A | 12/1999 | Franklin et al. |
| 5,787,283 A | 7/1998 | Chin et al. | 6,002,767 A | 12/1999 | Kramer |
| 5,787,403 A | 7/1998 | Randle | 6,003,762 A | 12/1999 | Hayashida |
| 5,788,285 A | 8/1998 | Wicker | 6,006,205 A | 12/1999 | Loeb et al. |
| 5,789,732 A | 8/1998 | McMahon et al. | 6,006,208 A | 12/1999 | Forst et al. |
| 5,793,861 A | 8/1998 | Haigh | 6,009,442 A | 12/1999 | Chen et al. |
| 5,794,221 A | 8/1998 | Egendorf | 6,012,049 A | 1/2000 | Kawan |
| 5,796,827 A | 8/1998 | Coppersmith et al. | 6,014,634 A | 1/2000 | Scroggie et al. |
| 5,802,498 A | 9/1998 | Comesanas | 6,014,636 A | 1/2000 | Reeder |
| 5,802,499 A | 9/1998 | Sampson et al. | 6,016,482 A | 1/2000 | Molinari et al. |
| 5,812,988 A | 9/1998 | Sandretto | 6,016,484 A | 1/2000 | Williams et al. |
| 5,819,236 A | 10/1998 | Josephson | 6,018,718 A | 1/2000 | Walker et al. |
| 5,819,238 A | 10/1998 | Fernholz | 6,021,202 A | 2/2000 | Anderson et al. |
| 5,823,463 A | 10/1998 | Fissmann et al. | 6,026,388 A | 2/2000 | Liddy et al. |
| 5,826,241 A | 10/1998 | Stein | 6,029,139 A | 2/2000 | Cunningham et al. |
| 5,826,245 A | 10/1998 | Sandberg-Diment | 6,029,141 A | 2/2000 | Bezos et al. |
| 5,826,247 A | 10/1998 | Pintsov et al. | 6,029,153 A | 2/2000 | Bauchner et al. |
| 5,832,090 A | 11/1998 | Raspotnik | 6,032,133 A | 2/2000 | Hilt et al. |
| 5,832,447 A | 11/1998 | Rieker | 6,032,134 A | 2/2000 | Weissman |
| 5,832,457 A | 11/1998 | O'Brien | 6,032,136 A | 2/2000 | Brake, Jr. et al. |
| 5,832,460 A | 11/1998 | Bednar | 6,032,137 A | 2/2000 | Ballard |
| 5,832,463 A | 11/1998 | Funk | 6,032,257 A | 2/2000 | Olarig et al. |
| 5,832,464 A | 11/1998 | Houvener et al. | 6,035,281 A | 3/2000 | Crosskey et al. |
| 5,832,488 A | 11/1998 | Eberhardt | 6,035,285 A | 3/2000 | Schlect et al. |
| 5,835,580 A | 11/1998 | Fraser | 6,035,287 A | 3/2000 | Stallaert et al. |
| 5,835,603 A | 11/1998 | Coutts | 6,036,099 A | 3/2000 | Leighton |
| 5,835,899 A | 11/1998 | Rose et al. | 6,038,553 A | 3/2000 | Hyde, Jr. |
| 5,842,421 A | 12/1998 | Desilets et al. | 6,039,249 A | 3/2000 | Szewezykowski |

| Patent | Date | Inventor |
|---|---|---|
| 6,041,312 A | 3/2000 | Bickerton et al. |
| 6,041,315 A | 3/2000 | Pollin |
| 6,044,362 A | 3/2000 | Neely |
| 6,045,039 A | 4/2000 | Stinson et al. |
| 6,047,261 A | 4/2000 | Siefert |
| 6,048,271 A | 4/2000 | Barcelou |
| 6,052,674 A | 4/2000 | Zervides et al. |
| 6,058,307 A | 5/2000 | Garner |
| 6,058,379 A | 5/2000 | Odom et al. |
| 6,058,380 A | 5/2000 | Anderson et al. |
| 6,058,381 A | 5/2000 | Nelson |
| 6,061,665 A | 5/2000 | Bahreman |
| 6,064,764 A | 5/2000 | Bhaskaran et al. |
| 6,064,987 A | 5/2000 | Walker et al. |
| 6,065,675 A | 5/2000 | Teicher |
| 6,067,524 A | 5/2000 | Byerly et al. |
| 6,070,150 A | 5/2000 | Remington et al. |
| 6,070,798 A | 6/2000 | Nethery |
| 6,073,104 A | 6/2000 | Field |
| 6,073,113 A | 6/2000 | Guinan |
| 6,076,072 A | 6/2000 | Libman |
| 6,078,907 A | 6/2000 | Lamm |
| 6,081,790 A | 6/2000 | Rosen |
| 6,085,168 A | 7/2000 | Mori et al. |
| 6,088,683 A | 7/2000 | Jalili |
| 6,088,685 A | 7/2000 | Kiron et al. |
| 6,088,686 A | 7/2000 | Walker et al. |
| 6,091,362 A | 7/2000 | Stilp et al. |
| 6,092,056 A | 7/2000 | Tull, Jr. et al. |
| 6,092,057 A | 7/2000 | Zimmermann et al. |
| 6,098,053 A | 8/2000 | Slater |
| 6,098,070 A | 8/2000 | Maxwell |
| 6,100,120 A | 8/2000 | Yu |
| 6,101,479 A | 8/2000 | Shaw |
| 6,105,007 A | 8/2000 | Norris |
| 6,105,011 A | 8/2000 | Morrison, Jr. |
| 6,108,639 A | 8/2000 | Walker et al. |
| 6,108,641 A | 8/2000 | Kenna et al. |
| 6,108,642 A | 8/2000 | Findley |
| 6,110,044 A | 8/2000 | Stern |
| 6,111,858 A | 8/2000 | Greaves et al. |
| 6,112,085 A | 8/2000 | Garner et al. |
| 6,115,690 A | 9/2000 | Wong |
| 6,119,011 A | 9/2000 | Borst et al. |
| 6,119,106 A | 9/2000 | Mersky et al. |
| 6,119,107 A | 9/2000 | Polk |
| 6,125,354 A | 9/2000 | MacFarlane et al. |
| 6,125,391 A | 9/2000 | Meltzer et al. |
| 6,128,599 A | 10/2000 | Walker et al. |
| 6,128,602 A | 10/2000 | Northington et al. |
| 6,128,603 A | 10/2000 | Dent et al. |
| 6,129,273 A | 10/2000 | Shah |
| 6,138,118 A | 10/2000 | Koppstein et al. |
| 6,138,917 A | 10/2000 | Chapin, Jr. |
| 6,141,666 A | 10/2000 | Tobin |
| 6,144,726 A | 11/2000 | Cross |
| 6,144,946 A | 11/2000 | Iwamura |
| 6,148,293 A | 11/2000 | King |
| 6,149,055 A | 11/2000 | Gatto |
| 6,149,056 A | 11/2000 | Stinson et al. |
| 6,151,588 A | 11/2000 | Tozzoli et al. |
| 6,164,528 A | 12/2000 | Hills et al. |
| 6,167,385 A | 12/2000 | Hartley-Urquhart |
| 6,169,974 B1 | 1/2001 | Baumgartner et al. |
| 6,173,272 B1 | 1/2001 | Thomas et al. |
| 6,181,837 B1 | 1/2001 | Cahill et al. |
| 6,182,059 B1 | 1/2001 | Angotti et al. |
| 6,185,541 B1 | 2/2001 | Scroggie et al. |
| 6,185,542 B1 | 2/2001 | Moran et al. |
| 6,185,544 B1 | 2/2001 | Sakamoto et al. |
| 6,202,054 B1 | 3/2001 | Lawlor et al. |
| 6,205,433 B1 | 3/2001 | Boesch et al. |
| 6,213,391 B1 | 4/2001 | Lewis |
| 6,223,168 B1 | 4/2001 | McGurl et al. |
| 6,227,447 B1 | 5/2001 | Campisano |
| 6,233,565 B1 | 5/2001 | Lewis et al. |
| 6,233,566 B1 | 5/2001 | Levine et al. |
| 6,236,972 B1 | 5/2001 | Shkedy |
| 6,240,369 B1 | 5/2001 | Foust |
| 6,240,444 B1 | 5/2001 | Fin et al. |
| 6,243,580 B1 | 6/2001 | Garner |
| 6,243,689 B1 | 6/2001 | Norton |
| 6,247,000 B1 | 6/2001 | Hawkins et al. |
| 6,267,292 B1 | 7/2001 | Walker et al. |
| 6,278,981 B1 | 8/2001 | Dembo et al. |
| 6,278,996 B1 | 8/2001 | Richardson et al. |
| 6,279,158 B1 | 8/2001 | Geile et al. |
| 6,282,516 B1 | 8/2001 | Giuliani |
| 6,283,366 B1 | 9/2001 | Hills et al. |
| 6,285,777 B2 | 9/2001 | Kanevsky et al. |
| 6,289,322 B1 | 9/2001 | Kitchen et al. |
| 6,289,324 B1 | 9/2001 | Kawan |
| 6,292,789 B1 | 9/2001 | Schutzer |
| 6,298,335 B1 | 10/2001 | Bernstein |
| 6,301,379 B1 | 10/2001 | Thompson et al. |
| 6,301,567 B1 | 10/2001 | Leong et al. |
| 6,304,858 B1 | 10/2001 | Mosler et al. |
| 6,305,603 B1 | 10/2001 | Grunbok, Jr. et al. |
| 6,308,887 B1 | 10/2001 | Korman et al. |
| 6,321,212 B1 | 11/2001 | Lange |
| 6,324,524 B1 | 11/2001 | Lent et al. |
| 6,327,575 B1 | 12/2001 | Katz |
| 6,332,126 B1 | 12/2001 | Peirce et al. |
| 6,334,108 B1 | 12/2001 | Deaton et al. |
| 6,336,103 B1 | 1/2002 | Baker |
| 6,338,047 B1 | 1/2002 | Wallman |
| 6,338,049 B1 | 1/2002 | Walker et al. |
| 6,341,724 B2 | 1/2002 | Campisano |
| 6,343,279 B1 | 1/2002 | Bissonette et al. |
| 6,344,108 B1 | 2/2002 | Von Medvey et al. |
| 6,349,290 B1 | 2/2002 | Horowitz et al. |
| 6,349,972 B1 | 2/2002 | Geiger et al. |
| 6,351,735 B1 | 2/2002 | Deaton et al. |
| 6,354,491 B2 | 3/2002 | Nichols et al. |
| 6,356,881 B1 | 3/2002 | Milch et al. |
| 6,360,209 B1 | 3/2002 | Loeb et al. |
| 6,363,164 B1 | 3/2002 | Jones et al. |
| 6,363,364 B1 | 3/2002 | Nel |
| 6,363,365 B1 | 3/2002 | Kou |
| 6,366,967 B1 | 4/2002 | Wagner |
| 6,374,235 B1 | 4/2002 | Chen et al. |
| 6,377,935 B1 | 4/2002 | Deaton et al. |
| 6,390,362 B1 | 5/2002 | Martin |
| 6,393,409 B2 | 5/2002 | Young et al. |
| 6,404,866 B1 | 6/2002 | Hopper et al. |
| 6,405,173 B1 | 6/2002 | Honarvar et al. |
| 6,405,181 B2 | 6/2002 | Lent et al. |
| 6,409,593 B1 | 6/2002 | Petrecca |
| 6,411,806 B1 | 6/2002 | Garner et al. |
| 6,411,942 B1 | 6/2002 | Fujimoto |
| 6,411,947 B1 | 6/2002 | Rice et al. |
| 6,415,259 B1 | 7/2002 | Wolfinger et al. |
| 6,418,419 B1 | 7/2002 | Nieboer et al. |
| 6,418,420 B1 | 7/2002 | DiGiorgio et al. |
| 6,418,430 B1 | 7/2002 | DeFazio et al. |
| 6,424,947 B1 | 7/2002 | Tsuria et al. |
| 6,424,949 B1 | 7/2002 | Deaton et al. |
| 6,434,159 B1 | 8/2002 | Woodward et al. |
| 6,434,534 B1 | 8/2002 | Walker et al. |
| 6,446,072 B1 | 9/2002 | Schulze et al. |
| 6,454,647 B1 | 9/2002 | Woodbury, Jr. |
| 6,456,981 B1 | 9/2002 | Dejaeger et al. |
| 6,460,020 B1 | 10/2002 | Pool et al. |
| 6,464,134 B1 | 10/2002 | Page |
| 6,485,922 B1 | 11/2002 | Erickson et al. |
| 6,490,568 B1 | 12/2002 | Omara et al. |
| 6,493,685 B1 | 12/2002 | Ensel et al. |
| 6,495,437 B1 | 12/2002 | Yu |
| 6,513,019 B2 | 1/2003 | Lewis |
| 6,516,302 B1 | 2/2003 | Deaton et al. |
| 6,535,896 B2 | 3/2003 | Britton et al. |
| 6,536,663 B1 | 3/2003 | Lozier et al. |
| 6,542,739 B1 | 4/2003 | Garner |
| 6,547,129 B2 | 4/2003 | Nichols et al. |
| 6,554,185 B1 | 4/2003 | Montross et al. |
| 6,560,581 B1 | 5/2003 | Fox et al. |
| 6,567,791 B2 | 5/2003 | Lent et al. |
| 6,574,350 B1 | 6/2003 | Rhoads et al. |

| | | |
|---|---|---|
| 6,574,377 B1 | 6/2003 | Cahill et al. |
| 6,578,000 B1 | 6/2003 | Dodrill et al. |
| 6,578,015 B1 | 6/2003 | Haseltine et al. |
| 6,607,127 B2 | 8/2003 | Wong |
| 6,609,104 B1 | 8/2003 | Deaton et al. |
| 6,609,113 B1 | 8/2003 | O'Leary et al. |
| 6,609,125 B1 | 8/2003 | Layne et al. |
| 6,611,811 B1 | 8/2003 | Deaton et al. |
| 6,611,819 B1 | 8/2003 | Oneda |
| 6,629,081 B1 | 9/2003 | Cornelius et al. |
| 6,636,615 B1 | 10/2003 | Rhoads et al. |
| 6,647,376 B1 | 11/2003 | Farrar et al. |
| 6,658,393 B1 | 12/2003 | Basch et al. |
| 6,661,910 B2 | 12/2003 | Jones et al. |
| 6,662,215 B1 | 12/2003 | Moskowitz et al. |
| 6,684,195 B1 | 1/2004 | Deaton et al. |
| 6,687,684 B1 | 2/2004 | Whitehouse et al. |
| 6,704,714 B1 | 3/2004 | O'Leary et al. |
| 6,714,919 B1 | 3/2004 | Findley |
| 6,718,313 B1 | 4/2004 | Lent et al. |
| 6,721,715 B2 | 4/2004 | Nemzow |
| 6,728,397 B2 | 4/2004 | McNeal |
| D490,840 S | 6/2004 | Arakaki et al. |
| D491,186 S | 6/2004 | Arakaki et al. |
| D491,953 S | 6/2004 | Arakaki et al. |
| 6,754,640 B2 | 6/2004 | Bozeman |
| D496,365 S | 9/2004 | Liu et al. |
| 6,795,809 B2 | 9/2004 | O'brien et al. |
| 6,795,812 B1 | 9/2004 | Lent et al. |
| 6,804,786 B1 | 10/2004 | Chamley et al. |
| 6,806,145 B2 | 10/2004 | Haukka et al. |
| D498,236 S | 11/2004 | Liu et al. |
| 6,817,008 B2 | 11/2004 | Ledford et al. |
| 6,819,748 B2 | 11/2004 | Matada |
| 6,820,058 B2 | 11/2004 | Wood et al. |
| 6,824,066 B2 | 11/2004 | Weyant |
| 6,825,940 B1 | 11/2004 | Wu et al. |
| 6,826,542 B1 | 11/2004 | Virgin et al. |
| 6,834,344 B1 | 12/2004 | Aggarwal et al. |
| 6,856,973 B1 | 2/2005 | Bott |
| RE38,717 E | 3/2005 | Bothwell |
| 6,860,375 B2 | 3/2005 | Hallowell et al. |
| 6,865,547 B1 | 3/2005 | Brake, Jr. et al. |
| 6,874,139 B2 | 3/2005 | Krueger et al. |
| 6,883,004 B2 | 4/2005 | Bahl et al. |
| 6,885,994 B1 | 4/2005 | Scroggie et al. |
| 6,886,046 B2 | 4/2005 | Stutz et al. |
| 6,892,187 B2 | 5/2005 | Phillips et al. |
| 6,901,406 B2 | 5/2005 | Nabe et al. |
| 6,912,502 B1 | 6/2005 | Buddle et al. |
| 6,934,692 B1 | 8/2005 | Duncan |
| 6,938,156 B2 | 8/2005 | Wheeler et al. |
| RE38,801 E | 9/2005 | Rogers |
| 6,942,569 B2 | 9/2005 | Petracca |
| 6,945,453 B1 | 9/2005 | Schwarz, Jr. |
| 6,950,881 B1 | 9/2005 | Ndili |
| 6,950,940 B2 | 9/2005 | Wheeler et al. |
| 6,954,896 B1 | 10/2005 | Dodrill et al. |
| 6,961,710 B1 | 11/2005 | Yanagisawa et al. |
| 6,963,857 B1 | 11/2005 | Johnson |
| 6,965,882 B1 | 11/2005 | Lapstun et al. |
| 6,970,259 B1 | 11/2005 | Lunt et al. |
| 6,970,830 B1 | 11/2005 | Samra et al. |
| 6,970,855 B2 | 11/2005 | Das et al. |
| 6,980,970 B2 | 12/2005 | Krueger et al. |
| RE38,957 E | 1/2006 | Laussermair et al. |
| 6,999,938 B1 | 2/2006 | Libman |
| 6,999,943 B1 | 2/2006 | Johnson et al. |
| 7,003,476 B1 | 2/2006 | Samra et al. |
| 7,004,382 B2 | 2/2006 | Sandru |
| 7,006,979 B1 | 2/2006 | Samra et al. |
| 7,010,495 B1 | 3/2006 | Samra et al. |
| 7,014,110 B2 | 3/2006 | Minowa et al. |
| 7,024,374 B1 | 4/2006 | Day et al. |
| 7,024,385 B1 | 4/2006 | Adcock et al. |
| 7,025,256 B1 | 4/2006 | Drummond et al. |
| 7,039,600 B1 | 5/2006 | Meek et al. |
| 7,062,456 B1 | 6/2006 | Riehl et al. |
| 7,068,832 B1 | 6/2006 | Price et al. |
| 7,070,095 B1 | 7/2006 | Gandel et al. |
| 7,072,864 B2 | 7/2006 | Brake, Jr. et al. |
| 7,092,905 B2 | 8/2006 | Behrenbrinker et al. |
| 7,104,443 B1 | 9/2006 | Paul et al. |
| 7,121,471 B2 | 10/2006 | Beenau et al. |
| 7,133,846 B1 | 11/2006 | Ginter et al. |
| 7,143,063 B2 | 11/2006 | Lent et al. |
| 7,146,344 B2 | 12/2006 | Wankmueller |
| 7,155,409 B1 | 12/2006 | Stroh |
| 7,159,116 B2 | 1/2007 | Moskowitz |
| 7,177,836 B1 | 2/2007 | German et al. |
| 7,194,437 B1 | 3/2007 | Britto et al. |
| 7,200,255 B2 | 4/2007 | Jones et al. |
| 7,228,155 B2 | 6/2007 | Saunders |
| 7,249,112 B2 | 7/2007 | Berardi et al. |
| 7,266,511 B2 | 9/2007 | Teshima |
| 7,269,575 B1 | 9/2007 | Concannon et al. |
| 7,277,870 B2 | 10/2007 | Mourad et al. |
| 7,287,009 B1 | 10/2007 | Liebermann |
| 7,312,707 B1 | 12/2007 | Bishop et al. |
| 7,313,543 B1 | 12/2007 | Crane et al. |
| 7,317,823 B1 | 1/2008 | Price et al. |
| 7,328,211 B2 | 2/2008 | Bordner et al. |
| 7,337,148 B2 | 2/2008 | Xie et al. |
| 7,349,884 B1 | 3/2008 | Odom |
| RE40,220 E | 4/2008 | Nichols et al. |
| 7,356,516 B2 | 4/2008 | Richey et al. |
| 7,366,698 B1 | 4/2008 | Loy |
| 7,380,707 B1 | 6/2008 | Fredman |
| 7,398,253 B1 | 7/2008 | Pinnell |
| 7,401,048 B2 | 7/2008 | Rosedale et al. |
| 7,471,818 B1 | 12/2008 | Price et al. |
| 6,188,309 B1 | 2/2009 | Levine |
| 7,493,288 B2 | 2/2009 | Biship et al. |
| 7,506,804 B2 | 3/2009 | Zajkowski et al. |
| 7,512,551 B2 | 3/2009 | Postrel |
| 7,523,385 B2 | 4/2009 | Nguyen et al. |
| 7,536,354 B1 | 5/2009 | DeGroeve et al. |
| 7,546,272 B2 | 6/2009 | Loy |
| 7,577,611 B2 | 8/2009 | Heit et al. |
| 7,587,363 B2 | 9/2009 | Cataline et al. |
| 7,640,205 B2 | 12/2009 | Michelassi et al. |
| 7,647,344 B2 | 1/2010 | Skurtovich, Jr. et al. |
| 7,676,409 B1 | 3/2010 | Ahmad |
| 7,680,735 B1 | 3/2010 | Loy |
| 7,686,218 B2 | 3/2010 | Hessburg et al. |
| 7,707,111 B2 | 4/2010 | Brake, Jr. et al. |
| 7,734,545 B1 | 6/2010 | Fogliano et al. |
| 7,743,979 B2 | 6/2010 | Fredman |
| 2001/0011222 A1 | 8/2001 | McLauchlin et al. |
| 2001/0018666 A1 | 8/2001 | Sugiyama et al. |
| 2001/0018739 A1 | 8/2001 | Anderson et al. |
| 2001/0023415 A1 | 9/2001 | Keil |
| 2001/0027441 A1 | 10/2001 | Wankmueller |
| 2001/0029490 A1 | 10/2001 | Inamochi |
| 2001/0032139 A1 | 10/2001 | Debonnet, Jr. |
| 2001/0034663 A1 | 10/2001 | Teveler et al. |
| 2001/0034718 A1 | 10/2001 | Shaked et al. |
| 2001/0037299 A1 | 11/2001 | Nichols et al. |
| 2001/0037300 A1 | 11/2001 | Miyazaki et al. |
| 2001/0037309 A1 | 11/2001 | Vrain |
| 2001/0038033 A1 | 11/2001 | Habib |
| 2001/0044747 A1 | 11/2001 | Ramachandran et al. |
| 2001/0044764 A1 | 11/2001 | Arnold |
| 2001/0047322 A1 | 11/2001 | Plate |
| 2001/0047334 A1 | 11/2001 | Nappe et al. |
| 2001/0047489 A1 | 11/2001 | Ito et al. |
| 2001/0051533 A1 | 12/2001 | Wietzke et al. |
| 2001/0051919 A1 | 12/2001 | Mason |
| 2002/0002485 A1 | 1/2002 | O'brien et al. |
| 2002/0002513 A1 | 1/2002 | Chiasson |
| 2002/0012445 A1 | 1/2002 | Perry |
| 2002/0013728 A1 | 1/2002 | Wilkman |
| 2002/0023055 A1 | 2/2002 | Antognini et al. |
| 2002/0026365 A1 | 2/2002 | Natanzon |
| 2002/0026394 A1 | 2/2002 | Savage et al. |
| 2002/0032651 A1 | 3/2002 | Embrey |
| 2002/0038363 A1 | 3/2002 | MacLean |
| 2002/0046106 A1 | 4/2002 | Ishibashi et al. |

| | | | | | | |
|---|---|---|---|---|---|---|
| 2002/0046169 A1 | 4/2002 | Keresman et al. | | 2003/0048888 A1 | 3/2003 | Hopper et al. |
| 2002/0047316 A1 | 4/2002 | Chitayat | | 2003/0055675 A1 | 3/2003 | Klein Twennaar |
| 2002/0049605 A1 | 4/2002 | Hagi | | 2003/0055783 A1 | 3/2003 | Cataline et al. |
| 2002/0052842 A1 | 5/2002 | Schuba et al. | | 2003/0065618 A1 | 4/2003 | VanDeBoe, Jr. |
| 2002/0052845 A1 | 5/2002 | Nielsen | | 2003/0065805 A1 | 4/2003 | Barnes, Jr. |
| 2002/0052852 A1 | 5/2002 | Bozeman | | 2003/0069780 A1 | 4/2003 | Hailwood et al. |
| 2002/0055907 A1 | 5/2002 | Pater et al. | | 2003/0083933 A1 | 5/2003 | McAlear |
| 2002/0059103 A1 | 5/2002 | Anderson et al. | | 2003/0097335 A1 | 5/2003 | Muskowitz et al. |
| 2002/0062257 A1 | 5/2002 | Minarnishin et al. | | 2003/0100803 A1 | 5/2003 | Lu et al. |
| 2002/0069134 A1 | 6/2002 | Solomon | | 2003/0105641 A1 | 6/2003 | Lewis |
| 2002/0069158 A1 | 6/2002 | Larkin et al. | | 2003/0105688 A1 | 6/2003 | Brown et al. |
| 2002/0072976 A1 | 6/2002 | Virtanen et al. | | 2003/0110070 A1 | 6/2003 | De Goeij |
| 2002/0073019 A1 | 6/2002 | Deaton | | 2003/0110136 A1 | 6/2003 | Wells et al. |
| 2002/0077890 A1 | 6/2002 | LaPointe et al. | | 2003/0110442 A1 | 6/2003 | Battle |
| 2002/0077966 A1 | 6/2002 | Harycki et al. | | 2003/0120686 A1 | 6/2003 | Kim et al. |
| 2002/0077978 A1 | 6/2002 | O'Leary et al. | | 2003/0125969 A1 | 6/2003 | Kizer et al. |
| 2002/0082962 A1 | 6/2002 | Farris et al. | | 2003/0126011 A1 | 7/2003 | Bryman et al. |
| 2002/0082985 A1 | 6/2002 | MacKay | | 2003/0130919 A1 | 7/2003 | Templeton et al. |
| 2002/0084321 A1 | 7/2002 | Martens et al. | | 2003/0130945 A1 | 7/2003 | Force et al. |
| 2002/0087415 A1 | 7/2002 | Allen et al. | | 2003/0130952 A1 | 7/2003 | Bell et al. |
| 2002/0087452 A1 | 7/2002 | Megiddo | | 2003/0135464 A1 | 7/2003 | Mourad et al. |
| 2002/0087468 A1 | 7/2002 | Ganesan et al. | | 2003/0144942 A1 | 7/2003 | Sobek |
| 2002/0087469 A1 | 7/2002 | Ganesan et al. | | 2003/0144952 A1 | 7/2003 | Brown et al. |
| 2002/0091635 A1 | 7/2002 | Dilip et al. | | 2003/0149629 A1 | 8/2003 | Claridge et al. |
| 2002/0099586 A1 | 7/2002 | Bladen et al. | | 2003/0158782 A1 | 8/2003 | Thomson et al. |
| 2002/0099649 A1 | 7/2002 | Lee et al. | | 2003/0158811 A1 | 8/2003 | Sanders et al. |
| 2002/0100803 A1 | 8/2002 | Sehr | | 2003/0172039 A1 | 9/2003 | Guy et al. |
| 2002/0107770 A1 | 8/2002 | Meyer et al. | | 2003/0187787 A1 | 10/2003 | Freund |
| 2002/0107788 A1 | 8/2002 | Cunningham | | 2003/0187789 A1 | 10/2003 | Karas et al. |
| 2002/0111837 A1 | 8/2002 | Aupperle | | 2003/0191710 A1 * | 10/2003 | Green et al. .................... 705/40 |
| 2002/0111891 A1 | 8/2002 | Hoffman et al. | | 2003/0200107 A1 | 10/2003 | Allen et al. |
| 2002/0116331 A1 | 8/2002 | Cataline et al. | | 2003/0208421 A1 | 11/2003 | Vicknair et al. |
| 2002/0120537 A1 | 8/2002 | Morea et al. | | 2003/0208439 A1 | 11/2003 | Rast |
| 2002/0120571 A1 | 8/2002 | Maung et al. | | 2003/0208441 A1 | 11/2003 | Poplawski et al. |
| 2002/0120846 A1 | 8/2002 | Stewart et al. | | 2003/0212630 A1 | 11/2003 | Kahr |
| 2002/0123934 A1 | 9/2002 | Tanaka et al. | | 2003/0213843 A1 | 11/2003 | Jackson |
| 2002/0123946 A1 | 9/2002 | Haworth et al. | | 2003/0217003 A1 | 11/2003 | Weinflash et al. |
| 2002/0123948 A1 | 9/2002 | Yumoto | | 2003/0217005 A1 | 11/2003 | Drummond et al. |
| 2002/0128981 A1 | 9/2002 | Kawan et al. | | 2003/0217329 A1 | 11/2003 | Good |
| 2002/0129221 A1 | 9/2002 | Borgin et al. | | 2003/0218066 A1 | 11/2003 | Fernandes et al. |
| 2002/0133461 A1 | 9/2002 | Ramachandran | | 2003/0220863 A1 | 11/2003 | Holm et al. |
| 2002/0138390 A1 | 9/2002 | May | | 2003/0225663 A1 | 12/2003 | Horan et al. |
| 2002/0138398 A1 | 9/2002 | Kalin et al. | | 2003/0229525 A1 | 12/2003 | Callahan et al. |
| 2002/0145039 A1 | 10/2002 | Carroll | | 2003/0229590 A1 | 12/2003 | Byrne et al. |
| 2002/0147691 A1 | 10/2002 | Davis et al. | | 2003/0233255 A1 | 12/2003 | Dirienzo |
| 2002/0152116 A1 | 10/2002 | Yan et al. | | 2003/0233292 A1 | 12/2003 | Richey et al. |
| 2002/0156723 A1 | 10/2002 | Lilly et al. | | 2003/0233305 A1 | 12/2003 | Solomon |
| 2002/0165808 A1 | 11/2002 | Zamsky et al. | | 2003/0236679 A1 | 12/2003 | Galves et al. |
| 2002/0169658 A1 | 11/2002 | Adler | | 2003/0236747 A1 | 12/2003 | Sager |
| 2002/0170966 A1 | 11/2002 | Hannigan et al. | | 2003/0237046 A1 | 12/2003 | Parker et al. |
| 2002/0178071 A1 | 11/2002 | Walker et al. | | 2004/0002916 A1 | 1/2004 | Timmerman et al. |
| 2002/0178112 A1 | 11/2002 | Goeller et al. | | 2004/0010419 A1 | 1/2004 | Sinnott |
| 2002/0178117 A1 | 11/2002 | Maguire et al. | | 2004/0010462 A1 | 1/2004 | Moon et al. |
| 2002/0184123 A1 | 12/2002 | Sijacic et al. | | 2004/0010465 A1 | 1/2004 | Michalski et al. |
| 2002/0184145 A1 | 12/2002 | Sijacic et al. | | 2004/0019561 A1 | 1/2004 | Isturiz et al. |
| 2002/0184151 A1 | 12/2002 | Maloney | | 2004/0019605 A1 | 1/2004 | Keown et al. |
| 2002/0188478 A1 | 12/2002 | Breeland et al. | | 2004/0029569 A1 | 2/2004 | Khan et al. |
| 2002/0188565 A1 | 12/2002 | Nakamura et al. | | 2004/0039686 A1 | 2/2004 | Klebanoff |
| 2002/0194081 A1 | 12/2002 | Perkowski | | 2004/0039687 A1 | 2/2004 | Lent et al. |
| 2002/0194096 A1 | 12/2002 | Falcone et al. | | 2004/0039691 A1 | 2/2004 | Barratt et al. |
| 2002/0194117 A1 | 12/2002 | Nabe et al. | | 2004/0044606 A1 | 3/2004 | Buttridge et al. |
| 2002/0194119 A1 | 12/2002 | Wright et al. | | 2004/0049451 A1 | 3/2004 | Berardi |
| 2002/0198807 A1 | 12/2002 | Kobayashi et al. | | 2004/0049455 A1 | 3/2004 | Mohsenzadeh |
| 2002/0198817 A1 | 12/2002 | Dhir | | 2004/0049456 A1 | 3/2004 | Dreyer |
| 2002/0198822 A1 | 12/2002 | Munoz et al. | | 2004/0064401 A1 | 4/2004 | Palaghita et al. |
| 2002/0198830 A1 | 12/2002 | Randell et al. | | 2004/0064409 A1 | 4/2004 | Kight et al. |
| 2002/0199182 A1 | 12/2002 | Whitehead | | 2004/0078324 A1 | 4/2004 | Lonnberg et al. |
| 2003/0004874 A1 | 1/2003 | Ludwig et al. | | 2004/0078328 A1 | 4/2004 | Talbert et al. |
| 2003/0005288 A1 | 1/2003 | Moskowitz et al. | | 2004/0078332 A1 | 4/2004 | Ferguson et al. |
| 2003/0018549 A1 | 1/2003 | Fei et al. | | 2004/0094624 A1 | 5/2004 | Fernandes et al. |
| 2003/0018557 A1 | 1/2003 | Gilbert et al. | | 2004/0111363 A1 | 6/2004 | Trench et al. |
| 2003/0018567 A1 | 1/2003 | Flitcroft et al. | | 2004/0111371 A1 | 6/2004 | Friedman |
| 2003/0023557 A1 | 1/2003 | Moore | | 2004/0128248 A1 | 7/2004 | Fujihara et al. |
| 2003/0028481 A1 | 2/2003 | Flitcroft et al. | | 2004/0133516 A1 | 7/2004 | Buchanan et al. |
| 2003/0033252 A1 | 2/2003 | Buttridge et al. | | 2004/0138991 A1 | 7/2004 | Song et al. |
| 2003/0037002 A1 | 2/2003 | Higgins et al. | | 2004/0139001 A1 | 7/2004 | Henriques et al. |
| 2003/0040927 A1 | 2/2003 | Sato et al. | | 2004/0143526 A1 | 7/2004 | Monasterio et al. |
| 2003/0040959 A1 | 2/2003 | Fei et al. | | 2004/0149544 A1 | 8/2004 | Dal Ferro |
| 2003/0046218 A1 | 3/2003 | Albanese et al. | | 2004/0158522 A1 | 8/2004 | Brown et al. |

| | | | | | | |
|---|---|---|---|---|---|---|
| 2004/0159700 A1 | 8/2004 | Khan et al. | | 2005/0246627 A1 | 11/2005 | Sayed |
| 2004/0169088 A1 | 9/2004 | Nelms et al. | | 2005/0251446 A1 | 11/2005 | Jiang et al. |
| 2004/0172358 A1 | 9/2004 | Lent et al. | | 2005/0256802 A1 | 11/2005 | Ammermann et al. |
| 2004/0177036 A1 | 9/2004 | Nutahara et al. | | 2005/0261916 A1 | 11/2005 | McCall et al. |
| 2004/0181441 A1 | 9/2004 | Fung et al. | | 2005/0261955 A1 | 11/2005 | Humble et al. |
| 2004/0193540 A1 | 9/2004 | Brown et al. | | 2005/0261995 A1 | 11/2005 | Phelan |
| 2004/0199406 A1 | 10/2004 | Owens et al. | | 2005/0273347 A1 | 12/2005 | Dudley et al. |
| 2004/0201735 A1 | 10/2004 | Baron | | 2005/0273425 A1 | 12/2005 | Yamazaki |
| 2004/0210498 A1 | 10/2004 | Freund | | 2005/0283429 A1 | 12/2005 | Bates et al. |
| 2004/0210531 A1 | 10/2004 | Barron et al. | | 2005/0283437 A1 | 12/2005 | McRae et al. |
| 2004/0228514 A1 | 11/2004 | Houle et al. | | 2005/0289051 A1 | 12/2005 | Allin et al. |
| 2004/0232223 A1 | 11/2004 | Beenau et al. | | 2006/0004629 A1 | 1/2006 | Neemann et al. |
| 2004/0236688 A1 | 11/2004 | Bozeman | | 2006/0015463 A1 | 1/2006 | Gupta et al. |
| 2004/0239481 A1 | 12/2004 | Beenau | | 2006/0020543 A1 | 1/2006 | Sheehan et al. |
| 2004/0242308 A1 | 12/2004 | Gray | | 2006/0031718 A1 | 2/2006 | Thornhill et al. |
| 2004/0243506 A1 | 12/2004 | Das | | 2006/0035444 A1 | 2/2006 | Nakamura et al. |
| 2004/0249689 A1 | 12/2004 | Naraki et al. | | 2006/0036553 A1 | 2/2006 | Gupta et al. |
| 2004/0249764 A1 | 12/2004 | Delitz et al. | | 2006/0039733 A1 | 2/2006 | Meyerhofer |
| 2004/0252012 A1 | 12/2004 | Beenau et al. | | 2006/0041540 A1 | 2/2006 | Shannon et al. |
| 2004/0254837 A1 | 12/2004 | Roshkoff | | 2006/0053056 A1 | 3/2006 | Alspach-Gross et al. |
| 2004/0260607 A1 | 12/2004 | Robbins et al. | | 2006/0064329 A1 | 3/2006 | Abolfathi et al. |
| 2005/0004864 A1 | 1/2005 | Lent et al. | | 2006/0080230 A1 | 4/2006 | Freiberg |
| 2005/0006286 A1 | 1/2005 | Fery et al. | | 2006/0080243 A1 | 4/2006 | Kemper et al. |
| 2005/0021363 A1 | 1/2005 | Stimson et al. | | 2006/0080254 A1 | 4/2006 | Chigira et al. |
| 2005/0021466 A1 | 1/2005 | Buchanan et al. | | 2006/0095350 A1 | 5/2006 | Hall et al. |
| 2005/0033619 A1 | 2/2005 | Barnes et al. | | 2006/0095358 A1 | 5/2006 | Viarengo et al. |
| 2005/0033690 A1 | 2/2005 | Antognini et al. | | 2006/0095374 A1 | 5/2006 | Lo et al. |
| 2005/0035847 A1 | 2/2005 | Bonalle et al. | | 2006/0106650 A1 | 5/2006 | Bush |
| 2005/0040242 A1 | 2/2005 | Beenau et al. | | 2006/0106717 A1 | 5/2006 | Randle et al. |
| 2005/0055254 A1 | 3/2005 | Schmidtberg et al. | | 2006/0136335 A1 | 6/2006 | Ferguson, III |
| 2005/0077349 A1 | 4/2005 | Bonalle et al. | | 2006/0143077 A1 | 6/2006 | Prorock |
| 2005/0086166 A1 | 4/2005 | Monk et al. | | 2006/0143117 A1 | 6/2006 | Chigira et al. |
| 2005/0086167 A1 | 4/2005 | Brake, Jr. et al. | | 2006/0149671 A1 | 7/2006 | Nix et al. |
| 2005/0086178 A1 | 4/2005 | Xie et al. | | 2006/0155554 A1 | 7/2006 | Mo |
| 2005/0091156 A1 | 4/2005 | Hailwood et al. | | 2006/0161478 A1 | 7/2006 | Turner et al. |
| 2005/0097033 A1 | 5/2005 | Pretell et al. | | 2006/0161501 A1 | 7/2006 | Waserstein et al. |
| 2005/0097046 A1 | 5/2005 | Singfield | | 2006/0167989 A1 | 7/2006 | Bashen et al. |
| 2005/0097050 A1 | 5/2005 | Orcutt | | 2006/0178986 A1 | 8/2006 | Giordano et al. |
| 2005/0108102 A1 | 5/2005 | York | | 2006/0206427 A1 | 9/2006 | Love et al. |
| 2005/0108151 A1 | 5/2005 | York | | 2006/0212391 A1 | 9/2006 | Norman et al. |
| 2005/0114367 A1 | 5/2005 | Serebrennikov | | 2006/0259390 A1 | 11/2006 | Rosenberger |
| 2005/0114883 A1 | 5/2005 | Nagai et al. | | 2006/0282389 A1 | 12/2006 | Gupte |
| 2005/0116024 A1 | 6/2005 | Beenau et al. | | 2006/0287953 A1 | 12/2006 | Chauhan |
| 2005/0125295 A1 | 6/2005 | Tidwell et al. | | 2007/0005498 A1 | 1/2007 | Cataline et al. |
| 2005/0125296 A1 | 6/2005 | Munoz et al. | | 2007/0061260 A1 | 3/2007 | deGroeve et al. |
| 2005/0125315 A1 | 6/2005 | Tidwell et al. | | 2007/0138255 A1 | 6/2007 | Carreon et al. |
| 2005/0125337 A1 | 6/2005 | Tidwell et al. | | 2007/0192216 A1 | 8/2007 | Arnold et al. |
| 2005/0125338 A1 | 6/2005 | Tidwell et al. | | 2007/0198404 A1 | 8/2007 | Hirka |
| 2005/0125339 A1 | 6/2005 | Tidwell et al. | | 2007/0265924 A1 | 11/2007 | Schwarz |
| 2005/0125350 A1 | 6/2005 | Tidwell et al. | | 2007/0288334 A1 | 12/2007 | Creedle et al. |
| 2005/0125351 A1 | 6/2005 | Tidwell et al. | | 2008/0010202 A1 | 1/2008 | Schwarz |
| 2005/0125360 A1 | 6/2005 | Tidwell et al. | | 2008/0040249 A1 | 2/2008 | Re et al. |
| 2005/0137951 A1 | 6/2005 | Michelassi et al. | | 2008/0116283 A1 | 5/2008 | Newbrough et al. |
| 2005/0137982 A1 | 6/2005 | Michelassi et al. | | 2008/0133350 A1 | 6/2008 | White et al. |
| 2005/0144059 A1 | 6/2005 | Schuessler | | 2008/0133522 A1 | 6/2008 | Bordner et al. |
| 2005/0144143 A1 | 6/2005 | Freiberg | | 2008/0193008 A1 | 8/2008 | Mount et al. |
| 2005/0149440 A1 | 6/2005 | Michelassi et al. | | 2008/0262915 A1 | 10/2008 | Gojkovic et al. |
| 2005/0154664 A1 | 7/2005 | Guy et al. | | 2009/0043651 A1 | 2/2009 | Schwarz |
| 2005/0159986 A1 | 7/2005 | Breeland et al. | | 2009/0112639 A1 | 4/2009 | Robinson et al. |
| 2005/0160051 A1 | 7/2005 | Johnson | | 2009/0150370 A1 | 6/2009 | Christensen et al. |
| 2005/0167342 A1 | 8/2005 | Vullride et al. | | 2009/0171778 A1 | 7/2009 | Powell |
| 2005/0167488 A1 | 8/2005 | Higgins et al. | | 2009/0313110 A1 | 12/2009 | Asai et al. |
| 2005/0171898 A1 | 8/2005 | Bishop et al. | | 2010/0057551 A1 | 3/2010 | Blaisdell |
| 2005/0171901 A1 | 8/2005 | Rosenblatt et al. | | 2010/0057553 A1 | 3/2010 | Ameiss et al. |
| 2005/0177480 A1 | 8/2005 | Huang | | 2010/0153199 A1 | 6/2010 | Ahmad |
| 2005/0177523 A1 | 8/2005 | Weiss et al. | | | | |
| 2005/0179251 A1 | 8/2005 | Wagoner et al. | | FOREIGN PATENT DOCUMENTS | | |
| 2005/0182654 A1 | 8/2005 | Abolfathi et al. | | EP | 421808 | 4/1991 |
| 2005/0182735 A1 | 8/2005 | Zager et al. | | EP | 0665486 | 8/1995 |
| 2005/0189427 A1 | 9/2005 | Brown et al. | | EP | 1014318 | 6/2000 |
| 2005/0199708 A1 | 9/2005 | Friedman | | JP | 2000029963 | 1/2000 |
| 2005/0199709 A1 | 9/2005 | Linlor | | JP | 2001-266039 | 9/2001 |
| 2005/0203857 A1 | 9/2005 | Friedman | | JP | 2002-24618 | 1/2002 |
| 2005/0209914 A1 | 9/2005 | Nguyen et al. | | JP | 2002-056063 | 2/2002 |
| 2005/0209954 A1 | 9/2005 | Asher et al. | | JP | 2002-083241 | 3/2002 |
| 2005/0209955 A1 | 9/2005 | Underwood et al. | | JP | 2002-087536 | 3/2002 |
| 2005/0216888 A1 | 9/2005 | Drummond et al. | | JP | 2002-508547 | 3/2002 |
| 2005/0228751 A1 | 10/2005 | Keown et al. | | JP | 2002-140505 | 5/2002 |
| 2005/0234789 A1 | 10/2005 | Czyzewski et al. | | WO | WO 9745796 | 4/1991 |

| | | |
|---|---|---|
| WO | WO 91/16691 | 10/1991 |
| WO | WO 93/08545 | 4/1993 |
| WO | WO 94/28497 | 12/1994 |
| WO | WO 96/08783 | 3/1996 |
| WO | WO 9612242 | 4/1996 |
| WO | WO 97/14108 | 4/1997 |
| WO | WO 9745814 | 12/1997 |
| WO | WO 98/09260 | 3/1998 |
| WO | WO 9910823 | 3/1999 |
| WO | WO 01/18060 | 3/2000 |
| WO | WO 0039979 | 7/2000 |
| WO | WO 0175730 | 10/2001 |
| WO | WO 02/063432 A3 | 8/2002 |
| WO | WO 2004/079603 | 9/2004 |

OTHER PUBLICATIONS

Jun. 9, 1924 (Item 2 from file: 275) DIALOG(R)File 275: Gale Group Computer DB(TM) (c) 2010 Gale/Cengage. All rights reserved.*
Annual Report Pursuant to Sectin 13 or 15(d) of The Securities Exchange Act of 1934, Form 10-K, Intelidata Technologies Corporation, Fiscal Year Ended Dec. 31, 2001.
Blockbuster running test of a stored value card, The American Banker, Sep. 1, 1995.
CESNaBANCO introduces stored value card technology blockbuster video is first merchant partner.
Card Flash Daily Payment Card News, www.cardweb.com, printed Sep. 23, 2004.
Anonymous, Chase Manhattan introduces new FEDI payables product, ProQuest document ID: 7806951, ISSN/ISBN: 02686635, May 1995.
Bills, Chase Pact Done, What's Next for Web Vendors?, The American Banker, Technology Section, Jun. 3, 2002, p. 23.
Reinbach, Chase steps up treasury system, ProQuest documednt ID 8723558, ISSN/ISBN: 10459472, Nov. 1995.
Anonymous, Chasing the global trend, Cash Management News, proQuest document ID 9319923, ISSN/ISBN: 02686635, Dec. 1995.
Malhotra, Clearing House Enumerates e-Payments Ills, The American Banker, vol. 167, No. 154, Aug. 23, 2002.
Marjanovic, Corporate Services: Chase Gears Up Global Payments System Series: 16, The American Banker, vol. 160, Issue 174, Sep. 11, 1995, p. 41.
Gluck, Creating a Global Cash-Management Game Plan, Bank Systems & Technology, Feb. 1997, p. 28.
Lamond, Credit Card Transactions Real World and Online, Paying by Credit Card-Real World and Online, http://www.virtualschool.edu/mon/ElectronicProperty/klamond/credit, printed Jul. 8, 2005, 17 pages.
Lamond, Keith, Credit Card Transactions Real World and Online, http://www.virtualschool.edu/mon/ElectronicProperty/klamond/credit_card.htm, pp. 1-17, printed Jul. 8, 2005.
Du Pont's Electronic Payments, Corporate EFT Report, v9, n1, Dialog file 636, Accession No. 01066902, Jan. 11, 1989.
Carreker, Electronic check presentment: Capturing new technology, http://proquest.umi.com, Banking Management, Rolling Meadows: vol. 71, Issue 2, Mar./Apr. 1995, p. 32, 5 pages.
Fidelity Helps Fund Sellers Trim the Taxes They'll Owe, The Wall Street Journal, Nov. 7, 2002.
First Data markets stored-value cards, Cards International, Jan. 30, 1996, p. 5.
Norris, First data unit develops blockbuster cash card, Omaha World Hearld Sunrise Edition, Business Section, Jan. 19, 1996, p. 16.
Harsh Truth: Your Investments Likely Won't Make Any Money.
Money, Initial Launch to 200 Credit Unions, USA Today.com, Jun. 27, 2002.
Decovny, Net Scope, Banking Technology, May 1997.
Nokia Announces the World's First NFC Enabled Mobile Product for Contactless Payment and Ticketing, PRNewswire, Feb. 9, 2005.
Goode, On Profit, Loss and the Mysteries of the Mind, The New York Times, Nov. 5, 2002.
Anonymous, Operating in a multi-currency environment, ProQuest document ID 9215937, ISSN/ISBN 09589309, Oct. 1995.

Maher and Troutman, Payor's Prescription for Painless Migration to Electronic Healthcare Payments and Remittance Advices, PNC Bank, Dec. 2001.
Press Release, Mar. 5, 2004, Payment Data Systems Files Patent on Debit Card Payment Solution, American City Business Journals, Inc., Mar. 5, 2004.
Maher and Troutman, Provider's Prescription for Painless Migration to Receipt of Electronic Healthcare Payments and Remittance Advices, PNC Bank, Dec. 2001.
Anonymous, Systems spell change for foreign exchange, Global Investor, ProQuest document ID 1056152B, ISSN/ISBN: 09513604, Nov. 1996.
French, Tech Stocks: Market Movers, Investors Worry CheckFree Being Chased from Its Own Game, http://www.thestreet.com, Jun. 20, 2002.
Technology, In Brief Wachovia-InteliData Deal, May 7, 2002.
Zuckerman, The Hedge-Fund Craze, The Wall Street Journal, Jun. 12, 2002.
McDonald, The Stars in the Sky Flicker, And Fund Stars Do the Same, The Wall Street Journal, Jan. 15, 2003.
Anonymous, Visa & Carnegie Mellon Plan Online Payment Scheme, Newsbyte News Network, Feb. 15, 1995.
Financial News, Wells Fargo Rolls Out Nationwide Lockbox Check Conversion, PR Newswire Association, Apr. 22, 2003.
Anonymous, IEM Product Description Home Screen from Web Page.
Anonymous, Opening the Mail Simultaneous Image Capture, Bank News—New Solutions Oct. 1996.
Hunt, Robert M., An Introduction to the Economics of Payment Card Networks, Review of Network Economics, vol. 2, Issue 2, Jun. 2003.
Keaton, "Bank of America Completes its Rollout of 'Paperless' Processing of Payments" Wall Street Journal (Eastern Edition), (lockbox), Nov. 1, 1999.
Anonymous Business Wire; 1A Corp. wins contract with comerica to install the first digital all items archive, one of nation's top 25 bank holding companies expects to streamline operations with the first client/server digital image all items solution; Jan. 9, 1996.
Anonymous Business Wire; IA Corp. shows complex transaction processing software Work vision at AIIM, plus Check Vision and Remit Vision application frameworks for new advanced banking services; IA also recruiting strategic partners and OEMs to distribute new, breakthrough data extraction product to be revealed in the fall, Apr. 14, 1997.
Anonymous, "Caere introduces the Model 1800 document remittance processor; compact unit provides cost effective means for low to medium speed document processing" Business Wire, Oct. 19, 1995.
Malyykhina, Elena, Cell Phone Software Formats Checks for Online Banking, Information Week—Business Innovation Powered by Technology, Jan. 24, 2008.
Anonymous, "Crestar to Introduce New Advanced Cash management System Based on IA Corp. Software . . . " Business Wire, Oct. 28, 1996.
Matyas, Stephen M., Digital Signatures—An Overview; pp. 87-94, (1979).
Friis, M. William; Goodbye to paper?; ABA Banking Journal, acs01037874, Mar. 1989.
Anonymous, "IA Corp. Announces New CheckVision Products; New CheckVision Archive Software Supports Short- and Long-Term Check Image Archival With Dynamic, Multi-Tiered Migration" Business Wire, Apr. 1, 1996.
Anonymous "IA Corporation Becomes a Major Player in Image-Based Cash Management Solutions" Business Wire, Nov. 24, 1995.
Anonymous "IA Announces installation at QuestPoint of first client/server cash management system with check image storage compatible with IBM, NCR and Unisys" Business Wire, May 29, 1997.
Anonymous "IA Presents New Advanced Cash Management Software at TMA to Link Banks and Their Corporate Customers . . . " Business Wire, Nov. 18, 1996.
Anonymous "IA's RemitVision Adopted by Harris Bank for CD-ROM and Online Customer Viewing of Check and Remittance Documents; Continues banking industry trends to use image-based processing as strategic weapon and increase online customer access to bank records" Business Wire, May 28, 1996.

Andersen Consulting, Image-based transaction processing; The banking industry's challenge for the 1990s and beyond; acs01039270, (1989).

Mead, Wendy S.; Two Banks' Imaging Deals Target Fee Revenue Increases; The American Banker; acs01039019, May 9, 1997.

Anonymous, "NCR introduces 7780 item processing system; image-based system scans and reads documents" Business Wire, Mar. 11, 1992.

Armstrong, Douglas, Norwest eases difficulty of Interstate banking Bank's customers may use the same account number at any branch, Milwaukee Journal Sentinel, Oct. 12, 1995.

Maturi, Richard, Personal Finance; When you Need to Send Cash in a Flash, The New York Times, Sep. 25, 1988.

Schutzer, Daniel; Get ready for electronic commerce; ABA Banking Journal; acs01038994, Jun. 1995.

Jensen, Business Publications: BNET, Topic: RSS Feed, U.S. Bank Effectively Manages Complexity; acs01039402; May/Jun. 2006.

Jensen, Business Publications: BNET, Topic: RSS Feed, U.S. Bank Effectively Manages Complexity; acs01039398, May/Jun. 2006.

Jensen, Business Publications: BNET, Topic: RSS Feed, U.S. Bank Effectively Manages Complexity; acs01039400, May/Jun. 2006.

Anonymous, Business Wire, State of Minnesota using AT&T Imaging Solution to Reenginer Sales Tax Paying Process: Department of Revenue Aims to Make Filing Sales Tax Forms Easier, acs01039027, Apr. 1994.

International Search Report, International Application No. PCT/US94/05046, 2 pages, citing 9 references, Jun. 27, 2004.

Block, Valerie, Blockbuster running test of a stored value card, The American Banker, Sep. 1, 1995.

Dialog file 20, #10279554; Offer: Book Yourself Free Cassettes; Mar. 25, 2000; Birmingham Post, p. 16.

Terrie Miller and Henry Yan, When Custody Governs, Benefits Canada, Toronto, Feb. 1998, vol. 22, Issue 2, p. 33, 5 pages.

Unknown, ABA Banking Journal The front end and back end functions of item processing will benefit from the technological advances of imaging Mar. 1990 acs01038997.

Arend, Bank applications fuel optical storage market ABA Banking Journal Oct. 1991 acs01039000.

Unknown, Alabama department of revenue selects Unisys for imaging solution to speed tax returns, save taxpayers money Sep. 6, 1995 acs01039064.

Alleman, Risk Assessment—Risk Assessment Template for Software Development or Acquisition Projects, Revision D, Feb. 20, 2001, Niwot Ridge Consulting.

Anonymous, PNC Bank Adds Chicago to National Lockbox Network Nov. 5, 1997.

Anonymous, Brink's Selects NetDeposit as Remote Capture Partner, Today, Oct. 2004, vol. 26, Iss. 5, p. 8.

Aubert, et al., Assessing the Risk of IT Outsourcing, Proceedings of the 31st Hawaii International Conference on System Sciences, 1998, pp. 685-692.

Unknown, BancTec selects alchemy CD-Based archival solution for remittance processing system May 6, 1998 acs01039047.

Stanley et al., Bank of America provides nationwide image lockbox services Oct. 20, 1999 acs01039405.

Business Wire Shawnut bank provides lockbox customers real-time, on-line electronic exception processing, 1A Corp's image-based lockbox system cuts processing time from days to minutes . . . Jan. 9, 1996 acs01039031.

Lupo, Chase image-enables NY wholesale lockbox facility with VICOR technology Aug. 31, 1999 acs01039406.

Anonymous, Chase offers image lockbox for Europe Aug. 1997 acs01039336.

Unknown, DMP and IMR Partner to develop electronic archiving solution for wholesale Lockboxes and remittance processing Mar. 24, 1998 acs01039040.

Fitch, Image technology brings lockbox breakthroughs Sep. 1995 acs01039344.

Joachim, Sparing Paper Checks That Last Trip to the Bank, The New York Time, Nov. 9, 2008, p. C6.

Tauhert, Lock box solutions reengineer payments Aug. 1996 acs01039337.

Moyer, Bank of Montreal to Install Imaging System by Unisys for Retail Lockbox Services The American Banker Oct. 22, 1996 acs01039023.

Moyer, KeyCorp joins trend to check imaging for lockbox The American Banker Aug. 23, 1996 acs01039004.

Marjanovic, NationsBank offers lockbox imaging Jul. 3, 1995 acs01039350.

Unknown, NationsBank rolls out first wholesale lockbox imaging Aug. 3, 1995 acs01039351.

Shannon, John, New lockbox platform due out at NationsBank, Feb. 1998 acs01039384.

Price Joanne et al. U.S. Appl. No. 60/133,577, May 11, 1999.

Buckley et al., Processing Noisy Structured Textual Data Using a Fuzzy Matching Approach Application to Postal Address Errors XP-001132075 pp. 195-205 (11 pages) Dec. 2000.

Unknown, Unknown Chapter Reports Texas Chapter Apr. 1998 acs01066110.

Unknown, Wassau Financial Systems' ImageRPS and OPEX interface a perfect Math Dec. 1997 acs01066108.

West, The Real Scoop About Merchant Account Rates & Fees, CDG commerce, Jun. 21, 2004.

Unknown, Wholesale lockbox imaging Feb. 1, 1993 acs01039331.

Clements, Harsh Truth Your Investments Likely Won't Make Any Money, Investors are Going Nowhere Fast, The Wall Street Journal, Nov. 27, 2002.

Goodson, BankServ Thomson Alliance Supports Bankserv's Echeck Service, Worldwide Videotext Update, Boston, May 1, 2000, vol. 19, Iss. 5, p. 1.

Grading System and Other Regulations—Course Information Suite', Programs of Study, 1997-1999, University of Illinois at Urbana-Champaign, at courses.illinois.edu/cis/programs/urbana/1999/grading_system.html.

McKendrick, Not Yet a Sign of the Times, Credit Card Management, Apr. 1999 (5 pages).

National Automated Clearing House Association (NACHA), Business-to-Business EIPP Presentment Models and Payment Options Part One—Presentment Models, Jan. 2001, Counsel for Electronic Billing and Payment, (cebp.nacha.org).

Non-Final Office Action Summary in U.S. Application No. 09/809,494 mailed Mar. 9, 2006.

Patterson, Overcoming the Float Time in Electronic Payment Use, Network World, Aug. 28, 1989, Opinion, Electronics Funds Transfer, p. 31 (2 pages).

Theisen, Retail Lockbox Check Conversion, Today, Boston, Dec. 2002, vol. 24, Iss. 6, p. 34 (3 pages).

Tsay, Electronic Data Interchange—A Challenge for Management Accountants, CMA Management Accounting Magazine, Aug. 1993, p. 19-22.

Unknown, Kelly Services Implements Image-Based Billing System for Customers, PR Newswire, Financial News, May 13, 1991 (1 page).

Urrows, et al., Automated Imaging in Financial Services, Document Image Automation, Sep.-Oct. 1991, vol. 11 No. 5, p. 259.

USPTO detailed schedule of classification system for Class 705, Mar. 25, 2009 (4 pages).

CES/NaBANCO introduces stored value card technology blockbuster video is first merchant partner, Business Wire, Inc., Jan. 15, 1996.

Clements, Jonathan, Clements, Harsh Truth Your Investments Likely Won't Make Any Money, Investors are Going Nowhere Fast, The Wall Street Journal, Nov. 27, 2002.

Goodson, Amy, Goodson, BankServ Thomson Alliance Supports Bankserv's Echeck Service, Worldwide Videotext Update, Boston, May 1, 2000, vol. 19, Iss. 5, p. 1.

Unknown, IA Corp. announces new CheckVision products new CheckVision archive software supports short Apr. 1, 1996 acs01039339.

IEM Product Description, Opex Image Export Module, Opex Process, Jun. 24, 1998 ACS01066106.

Khoury, Sarkis, Khoury, Sarkis, International Banking A Special Look at Foreign Banks in the US, J. Intl Business Studies, vol. 10, No. 3, (Winter 1979), pp. 36-52.

Laryea, Emmanuel T., Laryea, Payment for Paperless Trade—Are the Viable Alternatives to the Documentary Credit?, Law and Policy in International Business, Fall 2001, vol. 33, No. 1, pp. 3-49.

* cited by examiner

SYSTEM AND METHOD FOR INTEGRATING TRADING OPERATIONS INCLUDING THE GENERATION, PROCESSING AND TRACKING OF AND TRADE DOCUMENTS

RELATED APPLICATIONS

This application is a continuation of PCT Application No. PCT/US99/030976, filed Dec. 23, 1999, which claims priority to U.S. Provisional Patent Applications Nos. 60/113,561, filed Dec. 23, 1998; and 60/113,643, filed Dec. 23, 1998, the entire disclosures of which are hereby incorporated by reference.

FIELD OF THE INVENTION

The present invention generally relates to systems and methods for managing trading operations and more particularly to a system and method for generating, processing and tracking documents and processes associated with import/export trading operations.

BACKGROUND OF THE INVENTION

Presently, the process of documenting a trading operation between a buyer and a seller is manually intensive and error prone. Typically, a trading operation begins with a buyer wanting to purchase goods from a seller and requesting a price quote for the goods. The buyer and seller negotiate the terms of the trade resulting in the price quote as well as the other terms and conditions the two parties agree upon as being the basis of the agreement. The buyer then issues a purchase order (PO) to the seller reflecting the agreed upon price quote and the terms and conditions. The PO specifies the essential components of the transaction such as the type, amount and price of the goods as well as other details such as the time and place of delivery. Although not always required, the next step in the traditional process is the issuance of a Letter of Credit (L/C) by a bank. The L/C is generated from and typically incorporates all of the agreed upon terms and conditions and all of the PO information. The L/C is essentially a guarantee of payment by the bank that issued the L/C (the issuing bank) if the seller complies with all of the terms and conditions of the L/C. Specifically, as banks deal in documents and not goods, the seller must present a complete set of documents that strictly comply with the L/C in order for the issuing bank to honor the L/C. The L/C is issued by the issuing bank based upon the credit worthiness of the buyer.

The PO and/or L/C is transferred to the seller who is then in a position to manufacture (or supply) and ship the goods requested by the buyer. Internally, upon receipt of the PO and/or L/C, the seller creates a Sales Order in order to document the sale. The Sales Order reflects the requirements of the PO and/or L/C. If the seller is a manufacturer, the Sales Order is used to generate a manufacturing specification sheet from which the actual goods are manufactured. If the seller is a distributor the Sales Order is used to generate a warehouse pick slip that is used to pick the goods to be shipped. Alternatively, the seller can use the PO and/or L/C from the buyer to generate its own PO that is issued to the actual manufacturer of the goods. Once the manufacturing process is sufficiently complete, the seller contacts a shipper/freight forwarder to arrange for the shipment of the goods. The seller sends the shipper shipping instructions from which the shipper generates a Bill of Lading and customs documents (if required).

When the seller has the goods available for shipment (either through manufacturing, picking from the warehouse or acquisition from the manufacturer) the seller generates all of the documents required by the PO and/or L/C. These documents typically include an invoice for the goods, packing slip, certificate of analysis and/or origin. Additionally, the seller at this point provides for the transportation of the goods, procures shipping insurance and files the required trade documentation with both the origin and destination government authorities. Once the goods have been shipped, all of the trade documents required by the PO and/or L/C are presented for negotiation to the issuing bank (or another negotiation bank acting on the issuing bank's behalf).

As is readily seen from the above description, the process required to document a trading operation involves many parties generating many documents from the same redundant purchase information from the buyer that is entered in the systems of the bank, the seller and other trading partners, and is therefore susceptible to error and gross inefficiencies. These errors in the documentation lead to delays throughout the process including delays in the shipment of the goods. Any such errors result in the delay of receipt of the goods by the buyer and delay of receipt of payment by the seller. It is clear that all of the parties to the transaction would benefit from a system and method which reduces the number of errors in the documentation.

Since this documentation process is not part of an exporter's or an importer's core business (i.e., buying and selling goods) many exporters and importers are now outsourcing the documentation and tracking operations to third parties. Furthermore, since there is a certain level of risk exposure in the letter of credit collection process, many customers are looking to banks to assist them in their letter of credit fund collection.

SUMMARY OF THE INVENTION

In light of the above limitations of the prior art systems and methods, it is an object of the present invention to provide buyers, sellers, trading partners, their global affiliates, agents and supply chain service providers (e.g., shippers) with an automated facility in which all of the information associated with a trade is electronically exchanged and accessed via the Internet, third party network (Value Added Network, VAN), leased line or through dial up connection.

It is a further objective to automatically generate the documentation required for the trade from the trade agreement or instrument (e.g., Letter of Credit or Purchase Order).

It is also an object of the present invention to assist exporters (sellers) in monitoring their contractual agreements, assist in managing their production of goods and managing their risk exposure as well as providing an exporter with integrated treasury management services.

It is additionally an object of the present invention to assist importers (buyers) in monitoring their contractual agreements (e.g., outstanding obligations under Letters of Credit), providing information to assist in managing their inventory, and managing their contingent liability as well as providing an importer with integrated treasury management services.

In a preferred embodiment, the systems and methods of the present invention are operated and executed by a bank, but in practice, portions of the systems and methods can be operated and executed by any party. Although the present description of the present invention is made with respect to a bank, it should not be interpreted to be limited to a banking environment.

The present invention consists of four main components, TradeEDI, Trade Manager, TradeDoc and a Financial System. TradeEDI provides an electronic interface and gateway (e.g., secure Internet connection) to the system for customers. Trade Manager provides a customer interface for initiating and tracking of the status of a trade transaction. TradeDoc is primarily used on behalf of exporters (sellers/manufacturers) and supply chain service providers to assist in the generation of the voluminous and detailed documents required to support a trade transaction as well as to track and assist in the management of the seller's manufacturing/picking/procurement and shipment of the goods that form the basis of the trade transaction.

The trading operation is typically started by a buying party who is a customer of the bank. The buyer transmits a Purchase Order (PO) and/or Letter of Credit (L/C) application utilizing either Trade EDI or Trade Manager. The PO and/or L/C is transmitted either by electronic means or by paper (which is then keyed in or scanned at the bank). The PO and/or L/C represents the terms and conditions that the buyer and seller have agreed upon as governing the trade transaction (e.g., type and quantity of goods, unit price, delivery date and place . . . ) If requested, the system of the present invention can automatically generate an L/C from a supplied PO. Such a generated L/C goes through the normal approval process within the bank.

Once the PO and/or L/C is verified against the customer's profile, it is mapped into a database in the Financial System which in turn feeds a database maintained by Trade Manager. The database can either be relational, object oriented or a combination of both. From this point forward in the entire trade process, all of the parties to the trade transaction are able to log onto Trade Manager and quickly determine the status of any particular trade operation. In a preferred embodiment of the present invention, users employ a standard browser and the Internet to communicate with Trade Manager. Standard security techniques such as encryption and authentication and non-repudiation are used to provide confidential communications and to ensure proper identification of the parties over the Internet an other electronic communication media. The use of the Internet is an incredible advantage of the present invention since most trading operations involve parties which are distributed worldwide. For example, the buyer might be in Texas, the seller might be in Singapore, the buyer's bank might be in New York and the seller's bank might be in London. Using the present invention. Any of the parties can access Trade Manager 150 through the Internet and instantly find out the status of the trade operation. Additionally, TradeEDI can exchange the information (e.g., push the information) via an electronic message through the Internet or other communication media to the buyer seller or their respective trading partners as the trade transaction is being processed in the Financial System or TradeDoc.

The other significant part of the present invention is TradeDoc. As described above, in the traditional prior art approach, all of the documentation related to the trade transaction was generated manually from paper files. This manual generation is significantly labor intensive and error prone. As often said, the devil is in the details. Unfortunately, an error in the details with respect to a trade operation can extremely costly both in terms of delayed or lost revenues, but more importantly from a relationship point of view between a buyer and a seller. Even if a seller has significantly better products, buyers are not willing to deal with the seller if the seller cannot manage the administrative details of the documentation a deliver the requested goods on time. The present invention solves all of these problems of the prior art by automatically generating a verifying all of the documentation at each step of the seller process.

TradeDoc is a facility that can generate trade documents in accordance with the terms and conditions of an L/C or PO (in an Open Account transaction). TradeDoc's facilitates trade document processing for global supply chain customers where the buyer is customer of the bank and the seller may or may not be a customer of the bank. Trade Doc also generates the proper trade documents in a trade transaction for the seller when the seller is a customer of the bank and the buyer may or may not be a bank customer. TradeDoc maintains a comparable database to that maintained by Trade Manager and is therefore capable of generating a Sales Order for seller using the details contained in the L/C and/or PO. Alternatively, if the seller generates the sales order itself, TradeDoc compares the Sales Order to the L/C or PO to verify its accuracy. In a similar fashion, TradeDoc is capable of either generating or verifying manufacturing specification sheets, invoices, shipping instructions, insurance instructions, drafts, beneficiary certificates and Bills of Lading and virtually any other trade documents required for the seller to satisfy the L/C or PO. As the generation and verification operations performed by TradeDoc are all executed from the initiated purchase information of the L/C and/or PO in the same common database, all of the opportunity for error in the documentation is eliminated. Once the manufacturing has been completed and the goods are ready for shipment, TradeDoc generates all of the final export documents required to complete the transaction. TradeDoc can remotely print the completed documents at a location closest to the buyer or the buyer's bank to facilitate the collection process. In an alternative embodiment, all of the trade documents are transmitted to the receiving partner electronically. This embodiment is becoming more and more prevalent in electronic commerce transactions (e.g., electronic marketplace).

Each of TradeDoc, TradeEDI and Trade Manager are integrated systems that allow the customers of the bank to permit their trading partners to view the trade documents. Trade Manager provides viewing of trade documents generated by TradeDoc on a browser via the Internet. Based on the customer's profile, some trading partners are provided with the authorization to print documents. TradeEDI can receive or send electronic documents to trading partners based on the agreement of the customer which s reflected in the customer's profile.

The present invention further provides reconciliation functions for both the buyer and the seller. When the trade documents are presented for negotiation, the system informs the buyer's accounts payable systems of the payment and correlates the invoice from the seller to the L/C or PO issued by the buyer. Similarly, when a payment is received from they buyer, the present invention is capable of performing a reconciliation process by which the payment is reconciled against the seller's accounts receivables (e.g., invoiced items). In this manner the present invention is able to assist in every aspect of the trading operation, from initiation to collection while solving all of the above described problems of the prior art.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

Figure 1:
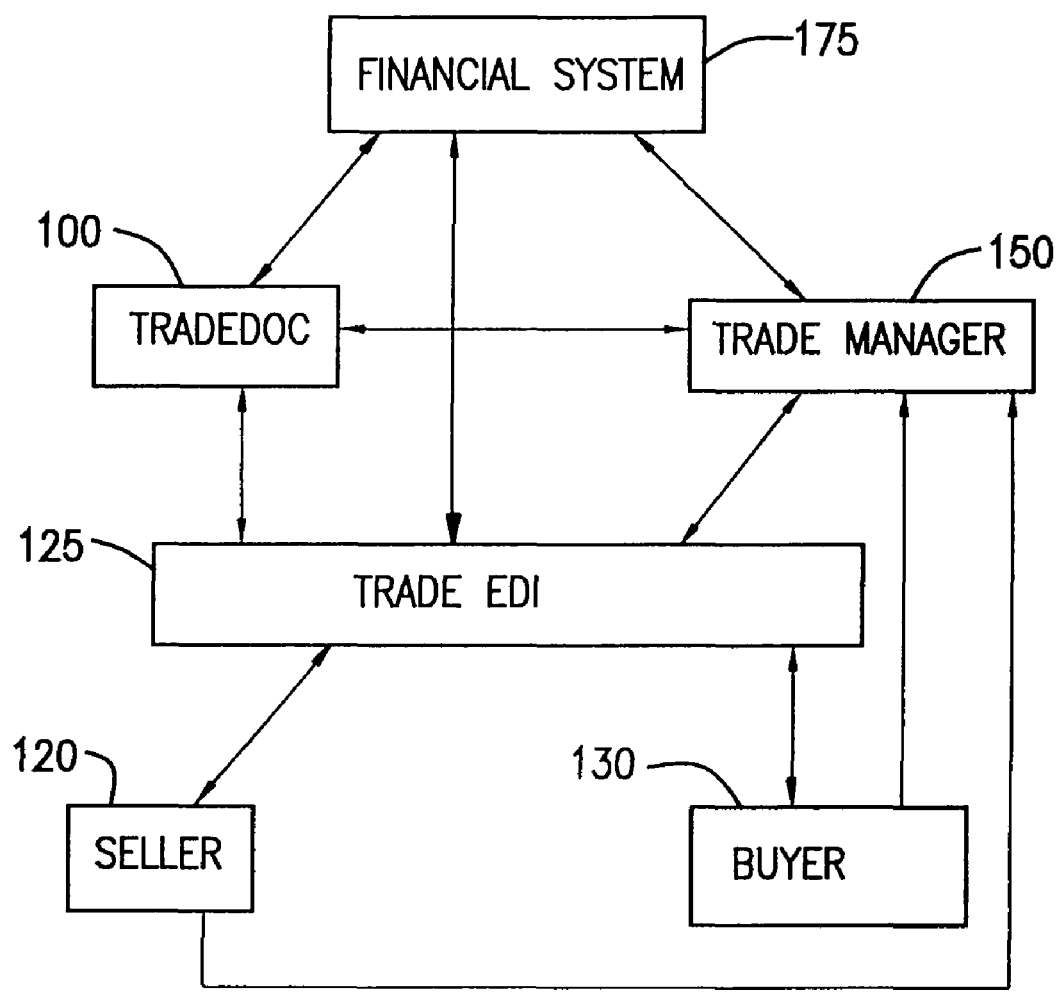
FIG. 1 illustrates the main components of the system of the present invention.

FIG. 1 illustrates the main components and dataflow of the system and method of the present invention. Element 100 is the TradeDoc element which includes the facilities for trade document preparation and generation. Element 150 is the Trade Manager element which provides tracking and communication services throughout the entire trade cycle. Element 125 is TradeEDI provides the electronic gateway and interface to secured exchange of information among customers and their trading partners via the Internet or other electronic communication media. Element 175 represents the Financial System 175 of a financial institution such as a bank. The Financial System 175 provides the tradition financial processing services such as the approval and generation of a Letter of Credit (L/C) or Open Account transaction and the payment and receipt of funds pursuant to the L/C or Open Account. Elements 120 and 130 respectively represent the Seller 120 and Buyer 130 in the trade transaction.

In a preferred embodiment, each of TradeDoc 100, Trade Manager 150 and the Financial System 175 is hosted and operated by a financial institution (e.g., a bank) and consist of a combination of software and hardware. Due to the scalability and various processing models (e.g., satellite and hub processing or distributive processing), Financial System 175 can be implemented using either client server mainframe processing. The client server technology can use Internet web technology such as SUN Javasoft or Netscape Web Server, Java servlets, HTML/XML and Java for presentation and CORBA technology allows the processing application servers located at various sites to communicate with each other. This netcentric technology allows remote branches with limited telecommunication bandwidth to access and initiate transactional information. In addition, the hub site can process using either UNIX or PC/NT servers using the C++ programming language and relational databases (e.g., Sysbase, Oracle or other similar relational database technology) to handle transaction processing and Visual Basic and Visual C++ on client workstations at the hub site. Alternatively, Financial System 175 can be implemented using traditional mainframe computer systems such as an IBM System 390. In each embodiment, the software operating as part of Financial System 175 includes custom software designed to carry out the functions described herein. In the banking environment, the Financial System 175 can include one centrally located facility or several geographically dispersed facilities such as in New York and London.

TradeDoc 100, TradeEDI 125 and Trade Manager 150 can be constituted by software executing on one or more mainframe systems or on one or more server systems. A mainframe system is one as described above with respect to the Financial System 175. In one embodiment of the present invention, TradeDoc 100, TradeEDI 125 and Trade Manager 150 operate on the same mainframe system as the Financial System 175. In a preferred embodiment of the present invention, TradeDoc 100, TradeEDI 125 and Trade Manager 150 utilize the same netcentric technology as described above with respect to the Financial System 175. Sun Javasoft or Netscape Web Server, Java servlets, HTML/XML and Java for presentation and CORBA technology for remote sites' application servers to communicate with each other. The application servers use commercially available netcentric technology with CORBA (e.g., WebLogics and Websphere). TradeEDI employs a commercially available EDI translator (e.g., Harbinger's OpenEDI, Gentran or others). Trade XML messages are used to facilitate message communications between the Financial System 175 and Trade Manager 150, TradeDoc 100 and TradeEDI 125. In each of the embodiments, Trade Manager 150, TradeEDI and TradeDoc 100 includes custom software programmed as described herein using the above described commercially available software.

In one embodiment, Financial System 175, Trade Manager 150 and TradeDoc 100 communicate with each other as illustrated in FIG. 1 by means of a corporate intranet. As the communications between Financial System 175, Trade Manager 150 and TradeDoc 100 involve sensitive financial information, the channels of the communication in the corporate intranet linking must provide a proper level of security. As is further illustrated in FIG. 1, both the Seller 120 and Buyer 130 each communicate with Trade Manager 150 and TradeDoc 100 through TradeEDI 125. In a preferred embodiment, the communication media between the Seller 120 or Buyer 130 and Trade Manager 150 and TradeDoc 100 is the public Internet. In this embodiment, the Seller 120 and Buyer 130 are each able to communicate with the system of the present invention using a standard Internet browser such as Netscape™ Navigator™ or Microsoft™ Explorer™, with TradeEDI 125 providing the proper encryption, authentication and non-repudiation required for secure financial communications. Alternatively the Seller 120 and Buyer 130 can connect to Trade Manager 150 or TradeDoc 100 using a leased line, third party network, or dial up line, again using TradeEDI 125 as the interface for secure communication.

The workstations employed by the Seller 120 and Buyer 130 are preferably any Internet ready device (e.g., personal computers (PCs), cellular phones with Internet capability or Personal Digital Assistants (PDAs) (hand held devices) that are Internet ready such as 3Com Palm V or VII). Alternatively, the Seller 120 and Buyer 130 workstations can be part of server or mainframe network system operated by or for the Seller 120 or Buyer 130. It will be recognized that the buyer and seller as well as other supply chain parties' workstations will contribute additional functionality to the processes associated with emerging e-commerce technologies such as virtual marketplaces (e.g. Intelysis, MySAP, SAPHIRE, and TradeMatrix.) As will be further described below, the Seller 120 and Buyer 130 workstations preferably communicate with one or more of the respective general ledger, administrative, accounting and manufacturing systems of the Seller 120 and Buyer 130.

As the communications between the Seller 120 and Buyer 130 on one side and Trade Manager 150 and TradeDoc 100 on the other side include financial and other proprietary information, appropriate security mechanisms are employed by TradeEDI 125 to protect these communications. In the direct dial and private network embodiments, security is enhanced by the private nature of the connection. In the public Internet embodiment though, extra security precautions must be taken. These security measures include for example authentication, encryption and non-repudiation. In authentication, Certifying Authority (CA) software is used to authenticate that information electronic communications are being sent by and received from the proper party without tampering and to further ensure that the communication cannot be repudiated. Furthermore, all communications are encrypted to prevent unauthorized access to the data contained in the communication. In one embodiment, Public Key technology is used for encryption, authentication and non-repudiation. As appreciated by those skilled in the art, the authentication, encryption and non-repudiation systems operate in accordance with the appropriate ANSI and ISO standards and guidelines.

Figure 2:
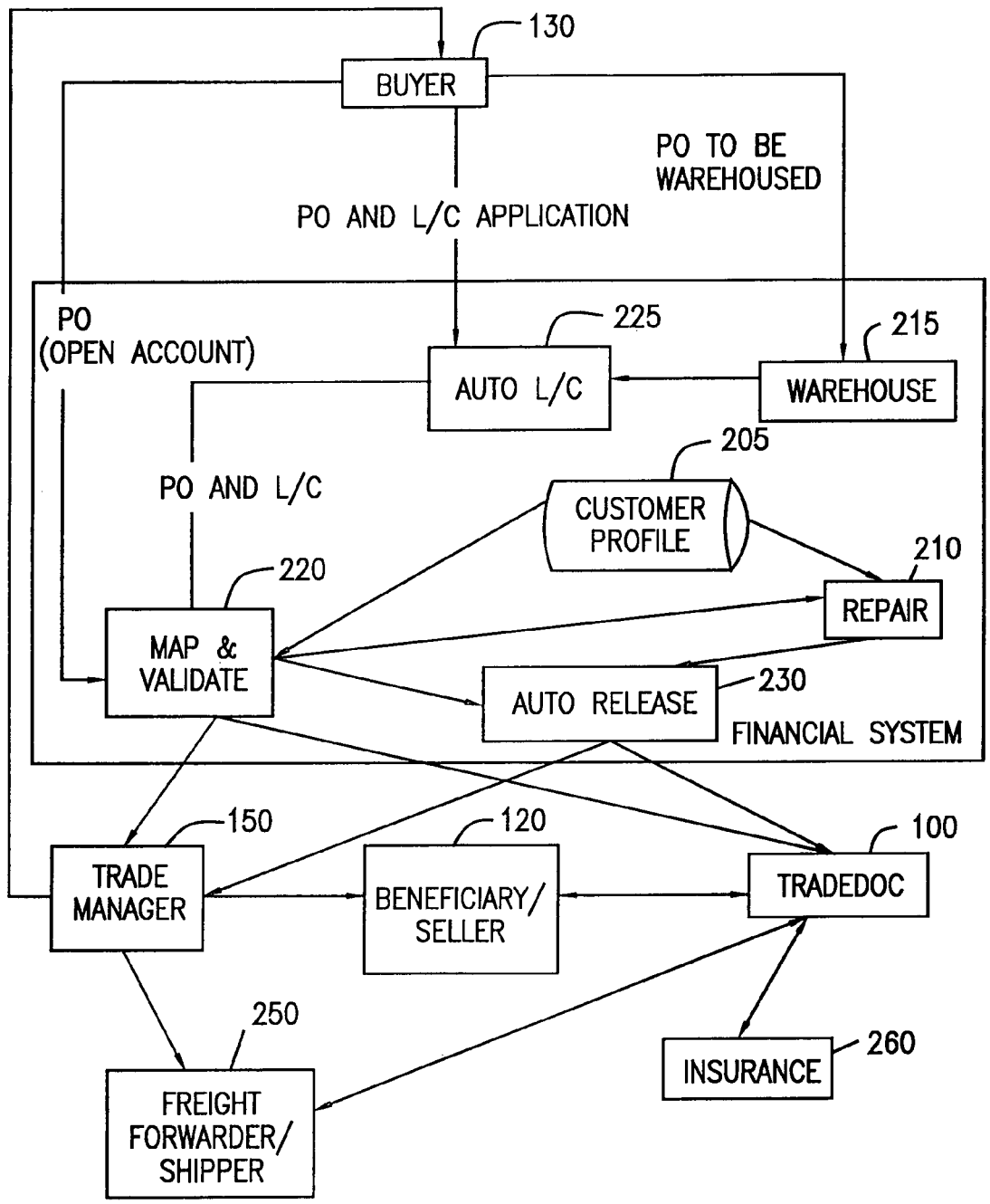
FIG. 2 depicts an overview of the functions performed by the various portions of the system of the present invention.

FIG. 2 illustrates in more detail the components and the processes of the present invention. The are essentially three phases to the process, Initiation, Tracking and Payment. FIG. 2 illustrates the initiation phase when the buyer is a customer of the financial institution operating the system. In the first phase, an application for an L/C and/or a PO from the Buyer 130 is received and processed by Financial System 175. In the second phase, the goods are manufactured, picked or procured and shipped, and all of the documentation required for this process is generated by TradeDoc 100 as is further illustrated in FIGS. 3A and 3B. In the final phase, payment and collection pursuant to the L/C or open account takes place. The payment process is further illustrated in FIG. 4. Each action in all of the phases is tracked by Trade Manager 150 which is accessible to all of the parties involved in the transaction (as noted below, certain information in Trade Manager 150 is accessible only to certain parties based on agreement between the parties).

As illustrated in FIG. 2, the process is initiated by the Buyer 130 transmitting to the bank either a PO by itself, or a PO and an application for an L/C. In a preferred embodiment, the documents are received from the Buyer 130 in electronic form, either through the Internet or other electronic communication means. Alternatively, the documents can be received in paper form and manually keyed or scanned in by bank personnel. In one embodiment of the present invention illustrated in FIG. 2, POs that are received from the Buyer 130 are stored (warehoused) by the Financial System 175 in a data warehouse 215 for subsequent grouping by the customer's business rules into one or more L/Cs. This is an attractive service to Buyer's 130 who do not want to develop or purchase an L/C system to track and monitor their L/Cs and the associated POs. As described above, certain trade transactions do not require an L/C and in these types of transactions the Buyer 130 merely sends the PO which initiates an Open Account transaction in the Financial System 175.

When electronic files are received from a Buyer 130, TradeEDI 125 (not shown in FIG. 2) translates the incoming data and utilizes the customer's profile contained in database 205 to map the data into the Financial System 175. This translation and mapping is performed for both L/C transactions and Open Account transactions. If the Buyer 130 has requested that the bank create an L/C from the PO, the L/C is automatically generated by an Auto L/C module 225. Auto L/C uses the PO information from the Buyer 130 and a pre-established customer profile for the Buyer 130 contained in database 205. The profile for the Buyer 130 contains standard L/C templates used by the Buyer 130 including standard L/C text and terms and conditions used for the particular Seller 100 involved in the trade transaction. The L/C generated by the Auto L/C 225 is customized based on the PO information and the buyer profile. For example, if the PO indicates a particular Seller 120, the Buyer 130 and Seller 120 can have a set of agreed upon terms and conditions which are reflected in the buyer profile. The terms and conditions with respect to a different Seller 120 might be different, and these differences are reflected in a different standard template for use with transactions involving that Seller 120. Each of the templates are stored in the buyer profile in database 205. Furthermore, different terms and conditions are generated depending on the goods, amounts, delivery dates . . . contained in the PO.

Financial System 175 provides for data validation utilizing the pre-established terms and conditions for the beneficiary (e.g., seller) and other parties contained in the Buyer's 130 profile in customer profile database 205. The data from the customer profile 205 and the Financial System 175 required data are compared to the incoming data from the Buyer 130 to ensure completeness and to meet the required UCP code. If there are no discrepancies, the Financial System 175 automatically performs a credit check with respect to the Buyer 130 and creates the L/C in the Auto Release process 230 (also known as straight through processing). This process requires no manual processing. If there are discrepancies found between the data from the Buyer 130 and the data in the customer's standing profile 205, the Financial System 175 sends the transaction to Repair 210 for manual review and potential repair or clarification with the Buyer 130. The Financial System 175 highlights the discrepancies to ease the review process.

Once the discrepancies have been resolved, or if there are no discrepancies, Auto Release 230 updates each of the database in Trade Manager 150 and if the Seller 120 is a part of the global supply chain network of the Buyer 130, a customer, or a customer of the bank's trading partners, the information will be sent to TradeDoc 100 to reflect the status of the issued L/C. Trade Manager 150 notifies the Seller 120 (or its advising bank or other agent) of the issuance of the L/C by the which the Seller 120 can commence its manufacturing/picking, procurement and shipping operations.

As described above, certain transactions known as Open Account transactions do not require a L/C and the PO alone forms the initiating documentation for the transaction. In this case, the PO is first validated (for consistent and complete information as described above) and mapped by the Financial System 175 into its own internal database for Financial System 175 tracking purposes. Once this validation and mapping has been completed, the PO information is transmitted to Trade Manager 150 and TradeDoc 100 for inclusion in the databases for those modules. Trade Manager 150 then notifies the Seller 120 (or its agent) of the issuance and receipt of the PO by the which the Seller 120 can commence its manufacturing/picking, procurement and shipping operations.

In an alternative embodiment of the present invention, the Buyer 130 can use a different banks to issue the L/C. In this embodiment, the Buyer 130 can establish agreements with all its banking providers to use TradeEDI 125, Trade Manager 150 and TradeDoc 100 to service all of its trade operations. The operator of the system of the present invention in this embodiment is operating as an outsource contractor and does not have any responsibility as an issuing or advising bank. In this embodiment, the Buyer 130 would also establish similar agreement with its vendors to utilize TradeEDI 125, Trade Manager 150 and TradeDoc 100. This would allow the Buyer 130 to have all the purchase and payment information in one location so that it can manage its global supply chain more efficiently. The Buyer 130 creates an electronic L/C application via either Trade Manager 150 or TradeEDI 125 and selects its designated issuing bank. The L/C application and PO information is mapped and validated using the buyer's customer profile into the Financial System 175. The complete L/C transaction is sent to Trade Manager 150 to allow the issuing bank to review and approve the transaction. The L/C data as well as the terms and condition can be downloaded by the issuing bank to interface with its internal financial system. The approval process can be either a single or multi level approvals. The number of approvers can also depend on dollar amount of the L/C. Once the designated issuing bank approves the transaction on Trade Manager 150, the L/C is released and issued by the designated bank to an advising bank or to the Seller 100. If there is an advising involved, the L/C will be sent by the Financial System 175 to the designated advising bank via SWIFT, Telex or mail. The issued L/C information can be downloaded from Trade Manager 150 or be sent by TradeEDI 125 to the designated issuing bank to update their internal financial systems. The L/C information is made available only to the L/C issuing bank and the Buyer 130. If the issuing bank and the Buyer 130 have an agreement with the Seller 100 and other related trading partners, the L/C information on Trade Manager 150 can be also access by these parties. The L/C and PO information are transmitted to TradeDoc 100 for trade documents preparation and can also assist the Seller 100 managing its L/Cs.

Regardless of whether the operative document is a PO or a PO or and L/C, all of the information from these documents is included in the Trade Manager 150 database. The most significant part of Trade Manager 150 is a database (relational, object oriented or a combination of both), business rules and customer profiles which allows for data entry, amendment, query and viewing. In the preferred embodiment, each record is based on an L/C and contains data with respect the following fields: L/C number, PO number, beneficiary name (e.g., Seller 120), beneficiary address, beneficiary country, ship to party name (optional), ship to party address (optional), goods description (optional), item number or style number (optional), color (optional), size (optional), shipping term (optional), port of loading (optional), country port of loading (optional), port of destination (optional), country port of destination (optional), earliest ship date (optional), latest ship date, mode of transportation (optional), quantity, units of measure for quantity, currency, unit price, unit of measure for unit price (optional if different from unit of measure for quantity) total amount, Buyer 130's SKU number (optional), Seller 120's SKU number (optional), manufacturer's SKU number (optional), division number (optional), tenor type (optional), tenor day (optional), tenor code (optional), and status. The above list is not exhaustive and particular implementations of the present invention may use more or less than the number any types of above described data fields. Furthermore, the primary index of the preferred database is the L/C, while other implementations can have records based on a PO.

Although the above discussion has referred to a single PO from the Buyer 130, in practice, several POs (each PO containing multiple items) can be covered by a single L/C or be considered part of an Open Account trading transaction. Trade Manager 150 provides the customer's profile with its associated vendor profiles and customer business rules in order to correlate between an L/C and all of the POs covered by the L/C. The bank typically wants to keep track of the status of the trade operation from an L/C point of view (since the L/C is the operative financial document), while the Buyer 130 and Seller 120 are more concerned with the status of the PO and its line items since these items represent the goods. In order to accommodate the different parties, Trade Manager 150 provides different views of the database. In a preferred embodiment, views are provided, by beneficiary (Seller 120) by L/C or by PO. In addition, a Buyer 120 may put more descriptive information on a L/C for merchandise inventory than contained in the PO in order to protect themselves (e.g., fabric content, item category (i.e., toys), etc.).

In response to a query by a user (e.g., a Buyer 130) the records from the Trade Manager 150 database are displayed to the user in a table format. For example if Buyer 130 makes an inquiry of the Trade Manager 150 database about all transactions involving beneficiary company XYZ (i.e., a Seller 120) Trade Manager 150 generates a tabular report that lists, for every transaction with company XYZ, the PO number, the L/C number, the quantity of goods, the unit price, the total PO amount and the current status. It is appreciated that the information which can be displayed by Trade Manager 150 can be tailored to individual users. For example, a particular Buyer 130 might be more concerned with the proposed delivery dates than it is concerned about the unit price. These delivery dates can easily be incorporated in the report for that Buyer 130. As described above, in the preferred embodiment, similar tabular views are available for sorting by L/C and/or PO.

In an aspect of the integrating TradeDoc 100 and Trade Manager 150, the Seller's 120 information can be made available to the Buyer 130. If the Buyer 130 and Seller 120 agree, information such as the manufacturer's status information, shipping status information and other such information can be made available to the Buyer 130 to monitor and track. This will allow the Buyer 130 to manage the inventory and the distribution of goods or to potentially redirect a shipment in the event of a change of circumstances.

One of the main tasks of Trade Manager 150 is to keep track of the history of the POs during the life of the respective L/C. If the PO or L/C is updated as a result of an amendment or payment, the value of the record is not overwritten, but rather Trade Manager 150 creates amendment or payment record which is then linked back to the base PO and/or L/C records. When viewing data from the Trade Manager 150 database, the user is given the option to zoom in on a selected record. As the user zooms in, Trade Manager 150 displays the details of the record, as well as the history (i.e., all amendments and payments). In a preferred embodiment, a running balance of both the quantity and amount is displayed under the history section.

Trade Manager 150 allows for file export by appropriately authorized users. Standard formats are supported such as ASCII, Excel™ and Lotus™ files. The export can take place by any of the means described above such as through the Internet or other private Electronic Data Interchange (EDI). The user can select from a list of all available data elements and specify the order by which each of the data elements is to be exported. Additionally, user can specify additional selection criteria such as date range, balance quantity or beneficiary. Trade documents, print files and electronic message associated with an L/C or PO transaction are available to be viewed by both the Seller 120, the Buyer 130, and other trading partners. Furthermore, Trade Manager 150 supports scheduled downloads of information to a user. This feature is attractive for Buyers 130 and Sellers 120 who maintain internal systems which require updating by the information available from Trade Manager 150. Trade Manager 150 also provides archiving services for its users. Typically a user would not want any records archived until the trade transaction embodied in the records has been completed (e.g., expired, canceled or fully drawn).

As briefly described above, Trade Manager 150 provides several security mechanisms to ensure confidential communications between the system and it users. These security mechanisms include encryption, authentication, non-repudiation. Furthermore, each user is provided with a profile which includes the data to which the user has authorized access. Naturally, Trade Manager 150 prevents a particular customer from viewing the trading transactions of another customer. Trade Manager 150 provides a further level of access security in which a customer can designate which of its employees can view particular data. For example an exporter (Seller 120) can designate that its manufacturing employees may view the PO data but not L/C financial data associated with a trade transaction. In the preferred embodiment, all of the users (other than the bank personnel) have read only rights with respect to the data stored in Trade Manager 150. This security feature ensures that no one can intentionally, or more likely, unintentionally alter the data contained in the database. If a user discovers an error or other discrepancy in the database, the bank operators are notified and have the ability to modify the data to correct the error.

As described above, in the preferred embodiment of the present invention users access Trade Manager 150 using standard browsers and the Internet. One of the significant aspects and advantages of the present invention is that through the use of the Internet, geographically distributed parties to the transactions can each log onto Trade Manager 150 and instantly determine the status of a particular transaction. This is a quantum leap of innovation over the prior art in which determining the status of the transaction often involves several phone calls or faxes over several different time zones.

In parallel to the population of the Trade Manager 150 database, a similar database in TradeDoc 100 is populated with the transaction data. In the preferred embodiment, each of Financial System 175, Trade Manager 150 and TradeDoc 100 maintain their own separate databases. One technical reason for this implementation is that performance is enhanced with separate databases since a load on the database by one system does not impact use of the database by the other systems. One requirement of maintaining separate databases is that the data in each of the databases must be synchronized. One other reason for maintaining separate databases is the each of the systems Financial System 175, Trade Manager 150 and TradeDoc 100 can be operated separately and independently. For example, some Sellers 100 might want to use only TradeDoc 100 for managing their own internal processes without the need for any of the functions provided by Financial System 175 or Trade Manager 150. In this embodiment, a facility incorporating just TradeDoc 100 and its separate database can be established for this Seller 100. In an alternative embodiment, a single common database can be provided for Financial System 175, Trade Manager 150 and TradeDoc 100. In this embodiment, no synchronization of data is required, but there may be performance impacts as described above. However, in a small site, all of the database can be combined into a single database.

As briefly described above, TradeDoc 100 is a tool for managing the trade process from the period from the advice of the L/C and/or PO to te Seller 120, to the point of the collection of the payment for delivered goods. As described above, certain Sellers 120 can have an agreement with the bank to use TradeDoc 100 to generate trade documentation without the bank having the capacity as either the issuing or advising bank. This is possible since TradeDoc 100 is typically operated by the document preparation unit of the bank, which is a separate from the L/C department which manages the Financial System 175. Furthermore, a Buyer 130 can mandate in its agreement with the Seller 120 that the Seller 120 use TradeDoc 100 in managing its documentary processes. TradeDoc 100 can have the same information as Trade Manager 150 for those Sellers 120 that are the recipient of the L/Cs or POs directly from the Buyer 130 or the Buyer's 130 issuing bank or the Seller's 120 advising bank. In this embodiment, both the TradeDoc 100 and Trade Manager 150 databases are updated with the L/C and/or PO information supplied directly from the Seller 120 or from the advising or issuing bank. This includes any amendments and payment information.

In the preferred embodiment illustrated in FIG. 2, TradeDoc 100 is operated by the financial institution on behalf of its clients, the Sellers 120, but access to the TradeDoc 100 system can be granted to other licensed users (e.g., Buyers 130) if the Seller 120 in the transaction so desires. Some Sellers 120 would not want to let the Buyer monitor the internal status of the Seller's process, but some Buyer's might on insist on such monitoring capability. A full description of the operation of the TradeDoc 100 system is found below in connection with FIG. 3, but as generally depicted in FIG. 2, TradeDoc 100 generates all of the documentation required by the trade transactions and interacts with third parties such as forwarders, brokers, customs or other government agencies, Shippers 250, Insurance Providers 260 and other parties in the supply chain in order to ensure that the process flows smoothly and is not held up due to incorrect or insufficient documentation.

Figure 3A:
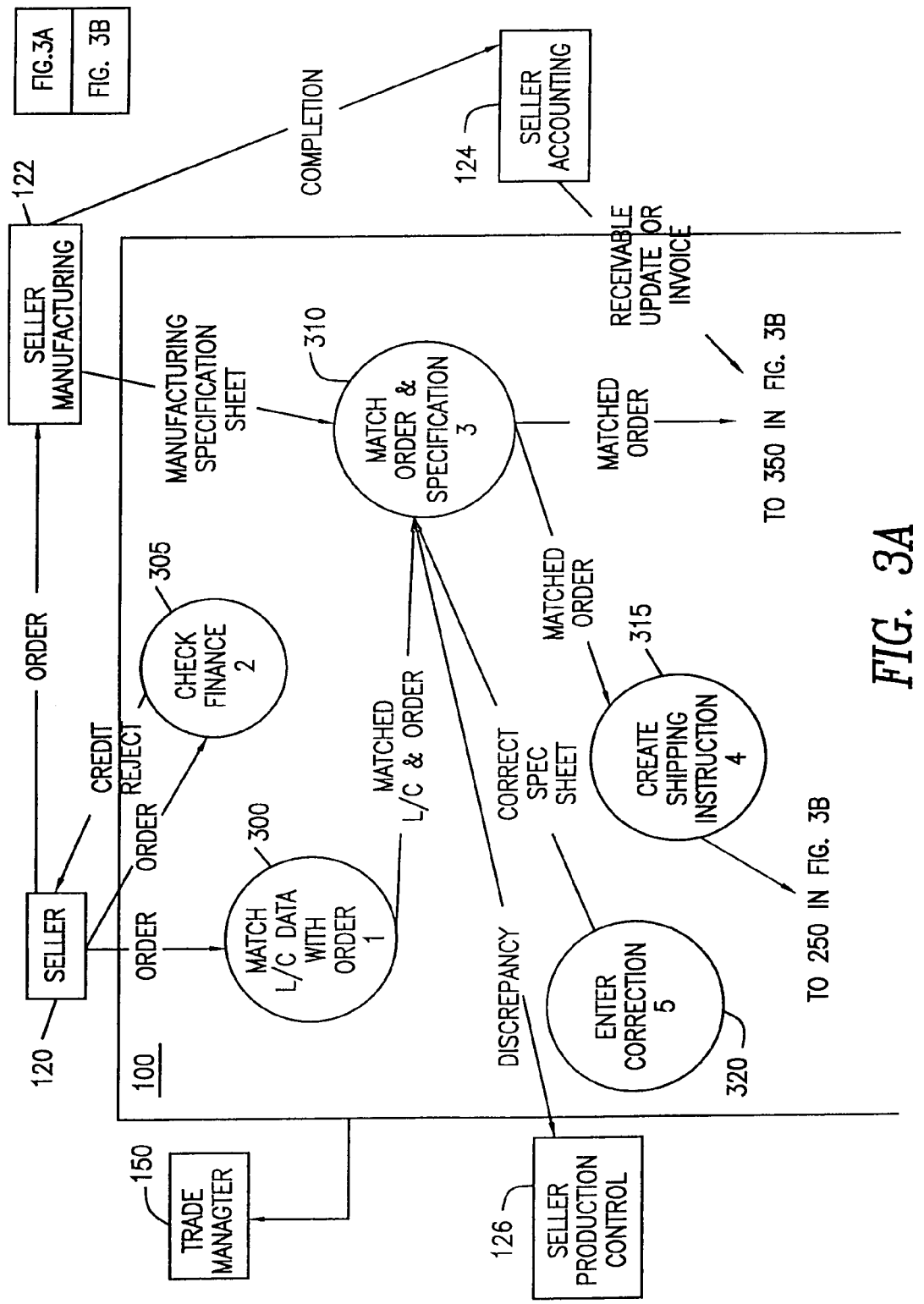
FIGS. 3A and 3B illustrates process executed by the TradeDoc component of the present invention.
Figure 3B:
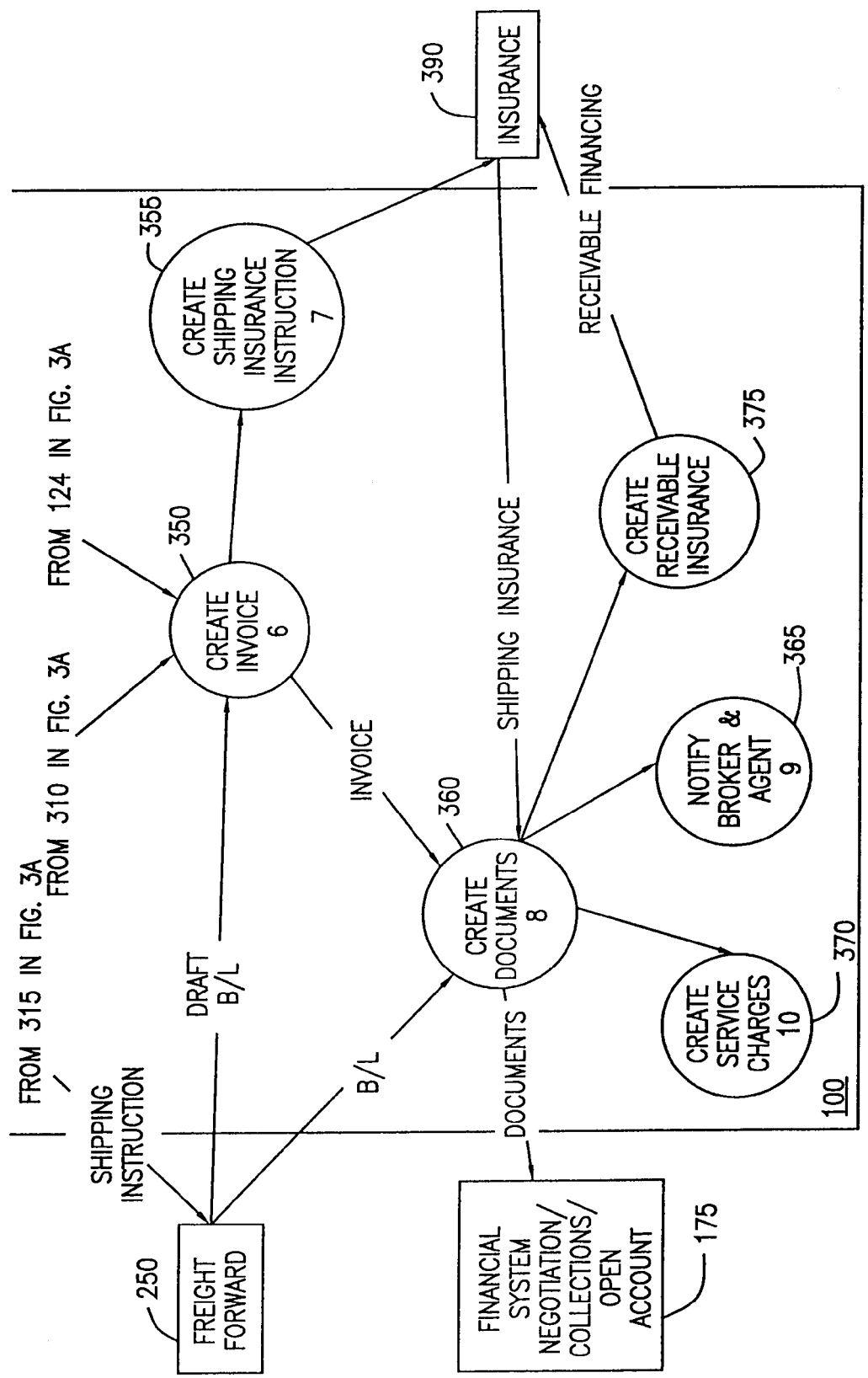

FIGS. 3A and 3B illustrate the operation of TradeDoc 100 in assisting a Seller 120 in managing the process of generating the documentation required to complete the trade operation. As is further illustrated in this Figure, TradeDoc 100 also assists the Seller 120 in its internal manufacturing processes by ensuring the goods manufactured conform to the L/C and or PO. Prior to describing the TradeDoc 100 process, a brief discussion of the database used by TradeDoc 100 is warranted. The database in TradeDoc 100 is similar to the database maintained in Trade Manager 150. Each record in TradeDoc 100 preferably contains the following fields: Issuing bank L/C number; Advising bank L/C number; Issuing bank name and address; Advising bank name and address; Beneficiary name and address; L/C currency; L/C amount; L/C issuing date; L/C expiry date; L/C tenor; Latest shipment date; Merchandise Inventory; Tran-shipment allowable indicator; Partial shipment allowable indicator; Special Instruction; Reimbursement Instruction; and Amendment Number. As can be seen some of the fields in the TradeDoc 100 database are the same as in the Trade Manager 150 database (e.g., L/C number) while others (e.g., Tran-shipment allowable indicator) are only required for the generation of documentation by TradeDoc 100 and are accordingly not tracked by Trade Manager 150.

As TradeDoc 100 receives data for the fields described above with respect to a trade transaction, it creates an L/C record in the TradeDoc 100 database. From the terms of the L/C, TradeDoc 100 is able to create a list of the required documents as will be described below with respect to FIGS. 3A and 3B. In addition, TradeDoc 100 parses and breaks down the L/C terms and conditions into attributes and processing rules in order to make the decision process with respect to document requirements more automated. In addition to an L/C record for each transaction, TradeDoc 100 can create (based on the customer's standard instructions) one or more 'Sales Order' record(s) from the 'Merchandise Inventory' data contained in the L/C or PO (note one L/C or PO can have more than one 'Sales Order' associated with it). As will be more fully described below, TradeDoc 100 allows a Seller 120 to keep track of the transaction on the basis of its own Sales Orders, rather than the PO or L/C issued by the Buyer 130. If the data originates from the Buyer 130, or the Buyer's issuing bank or advising bank, a Sales Order record is set up with a status of pending since TradeDoc 100 requires that the beneficiary (Seller 120) provide the details for the Sales Order record (e.g., such as ' Sales Order Number'). If the data originates directly from a Seller 120, the data is input and the status of the Sales Order record is set to 'Sales Order Confirmed'.

Reflecting the nature of commercial trading, amendments to L/Cs or POs occasionally occur and TradeDoc 100 is accordingly able to process such amendments. An amendment to an L/C or PO either comes directly from the Buyer 130 or the advising bank either in electronic or hardcopy form. Preferably, the amendment to the L/C or PO contains data for all of the fields as described above with respect to an original advisement of the L/C or PO. In an amended L/C or PO, the data reflects the amended terms. Upon receipt of the amended L/C or PO, TradeDoc 100 retrieves the original L/C or PO record from the TradeDoc 100 database based on the following matching criteria: Issuing Bank L/C number; Advising Bank L/C number; and the status of the L/C is not 'Cancel'. If no matching record is found, or if the record is found but the wrong status is detected on the matched L/C, the transaction is flagged on an exception report and process of amending the L/C is terminated. If the status of the L/C is 'Expired' or 'Bookoff' and the 'Expiry Date' in the proposed amended L/C is still earlier than the processing date, the transaction is flagged on an exception report and the amendment process is terminated pending manual rectification by TradeDoc 100 operators.

In processing an amended L/C or PO, TradeDoc 100 provides the following validations: a newly added Sales Order should not exist; a deleted or amended Sales Order must exist; and each amended Sales Order is validated against all its related 'Invoices' (if any) to check the remaining balance. If the above validation fails, TradeDoc 100 can either display a warning message and proceed with the process or display an error message and terminates the processing pending manual rectification. As with original L/Cs, if the supplied data is incomplete, it must be manually repaired.

Once an amended L/C has been validated, the L/C record is updated based on the amendment. Furthermore, the list or required documents (generated from the L/C and/or PO) is updated based on the revised L/C terms if needed. This may mean adding new document to the list, deleting old document from the list and/or amending the number of copies required for any existing document on the list. Finally, the Sales Order record(s) are updated if the Merchandise Inventory of the L/C is amended. This may mean adding new Sales Orders, deleting old Sales Orders and/or amending element(s) of any existing Sales Orders. If the data for the amended L/C/ came from anyone other than the Seller 120, any new or amended Sales Order must be confirmed by the Seller 120. Similar to amendments, TradeDoc 100 is capable of processing canceled L/Cs. It must be noted that TradeDoc 100 only amends the trade documents generated pursuant to the L/C and/PO or an amended L/C and/or an amended PO and does not amend the PO or L/C itself.

Returning to FIGS. 3A and 3B, these Figures illustrate both the process executed by TradeDoc 100 as well as the interactions of TradeDoc 100 with other systems (e.g., Trade Manager 150). The starting point for the process illustrated in these Figures is that the terms of the L/C and/or the PO have been agreed upon and included in the TradeDoc 100 and Trade Manager 150 databases, and it is presently the obligation of the Seller 120 to manufacture and deliver the goods according to the agreement between the parties. The Seller 100 is advised of either the L/C or the PO electronically via Trade Manager 150 or TradeEDI 125.

As described above with respect the TradeDoc 100 database, the operative document from which the Seller 120 manufactures its goods is an internal document known a Sales Order. Although not specifically illustrated in the Figures, TradeDoc 100 is capable of generating the Sales Order for the Seller 120 from the L/C and/or PO. Alternatively, the Seller 120 itself can generate the Sales Order. As shown in FIG. 3A, TradeDoc 100 communicates with Trade Manager 150 in order to keep current the status of the transaction as reported in Trade Manager 150. As milestones are reached in the process as described below, TradeDoc 100 provides Trade Manager 150 with an updated status. As described above, this status is available to the Seller 120 and to the Buyer 130 if agreed to by the Seller 120 and the Buyer 130.

Once the Sales Order has been generated, either by the Seller 120 itself or by TradeDoc 100, TradeDoc 100 in step 300 compares the details of the Sales Order to the details of the L/C and/or PO. This comparison is to verify that the Sales Order from which the Seller 120 complies with all of the requirements of the L/C and/or PO. For example, the L/C might require the manufacture and delivery of 1,000 units, while the Seller 120 might have mistakenly generated a Sales Order specifying 10,000 units. The check in step 300 will ensure that this type of mistake is caught and corrected prior any further, potentially costly, actions by the Seller 120.

Step 305 illustrates an optional function provided by TradeDoc 100. In practice, a Seller 120 may be in a position to provide financing, "supplier credit" to the buyer. If this is the case, the Seller checks the availability of credit under a preset credit limit for that particular Buyer 130. Typically, a financial institution performs the actual monitoring of the availability of credit for the Buyer 130 an TradeDoc assists the financial institution in making this determination by supplying the terms of the transaction. In step 305, the Sales Order is used in the determination if financing is available. Although not illustrated in FIG. 3A, the determination with respect to financing is either made by the bank operating TradeDoc 100 or by a third party source of financing. The resulting financing determining is reported back to the Seller 120.

At the same time the Sales Order is provided to TradeDoc 100, the Seller 120 provides the same Sales Order to its Manufacturing division 122. From the Sales Order, the Manufacturing arm 122 generates a manufacturing specification sheet from which its manufacturing employees will manufacture the actual goods. The Sales Order itself cannot efficiently be used by the manufacturing employees in their daily operations and planning functions. Although FIG. 3A specifies that the Manufacturing division 122 generates a manufacturing specification sheet, if the goods have already been manufactured and are in inventory (e.g., the Seller is a distributor and not a manufacturer), the Manufacturing division 122 can provide an inventory pick sheet that indicates the items which will be picked from inventory in order to satisfy the Sales Order.

The manufacturing specification sheet is forwarded to TradeDoc 100 which compares the Sales Order with the manufacturing specification sheet. This comparison in step 310 detects any deviation between the description of the goods requested by the Buyer 130 (embodied in the PO or L/C) and the description of the goods which the Manufacturing division 122 plans on making available in fulfillment of the Buyer's 130 request. Again, the comparison of step 310 is intended to discover any errors in the documentation being used by the Seller 120. Such errors can result in the manufacture of the wrong type or number of goods which in turn results in lost profits for the Seller 120. For example, if the Buyer 130 has ordered 10,000 blue units and the Manufacturing division 122 mistakenly manufactures 10,000 red units, the Seller 120 first of all has to go back and manufacture the originally requested blue units, most likely resulting in a delay in shipment, but the Seller 120 is additionally left with 10,000 red units in stock.

If TradeDoc 100 detects a discrepancy between the manufacturing specification sheet and the Sales Order, it notifies the Seller's production control 126. It is preferred that the matching step 310 occurs before any required manufacturing or picking takes place. As the comparison performed by TradeDoc 100 in step 310 is virtually instantaneous, the Seller 120 must only ensure that the specification sheet is generated and transmitted to TradeDoc 100 at some point before manufacturing begins. In step 320, the Seller's production control 126 makes the corrections to the manufacturing specification sheet and forwards the corrected sheet back to TradeDoc 100 where a confirmation comparison of the specification sheet is made with respect to the Sales Order. If the same or additional errors are detected, an iterative process can take place between TradeDoc 100 and the Seller 120's production control 126 system or personnel. Once no discrepancies are detected, the Manufacturing division 122 uses the verified manufacturing specification sheet to commence and eventually complete the manufacturing of the goods.

After completion of the comparison of step 310, the matched Sales Order is used by TradeDoc 100 to create shipping instructions (e.g., draft bill of lading or airway bill) in step 315. The process of arranging for the shipment of the goods takes place in parallel to the process of manufacturing of the goods. The draft bill of lading or airway bill or other shipping instructions are generated from the TradeDoc 100 database which includes, but is not limited to the following data with respect to shipping: Name of Applicant/Buyer 130; Currency; Amount; Tenor Information; Actual Shipment Date; Merchandise Inventory—Description and Quantity of Goods; Purchase Order/Contract Number; Name, Address and Telephone Numbers of the Third Party Documents, (e.g., Inspection Certificate, if any, Contact Person, if possible); and Special Instruction, if any. Prior to the present invention, the Seller 120 had to manually generate the shipping instructions which again provided the possibility of error, either human or systemic.

Once the shipping instructions document has been generated by the automatic process in step 315, TradeDoc 100 transmits the shipping instructions (e.g., packing lists) to the Freight Forwarder (Shipper) 250 as illustrated in FIG. 3B. Again, in the preferred embodiment, the Internet is used as the communication media for the transmittal of the shipping instructions from TradeDoc 100 to the Freight Forwarder 250. In response to the shipping instructions from TradeDoc 100, the Shipper 250 returns a draft Bill of Lading (B/L). The B/L is the commercial document used by Shippers 250 when transporting goods. In an alternative embodiment of the present invention, TradeDoc 100 can generate the draft B/L which is then transmitted to the Shipper 250 for approval. Although not separately illustrated in FIG. 3B, TradeDoc 100 in step 350 checks the draft B/L from the Shipper 250 in order to verify that it conforms with the details of the shipping instructions previously generated by TradeDoc 100.

In step 350, TradeDoc 100 automatically generates a invoice using the matched order from step 310 (see FIG. 3A) and from a receivable update or draft invoice from the Seller's 120 Accounting system 124 (see FIG. 3A). As shown in FIG. 3A, the Seller 120's Accounting department 124 only generates the receivable update or draft invoice only after the Seller's Manufacturing department 122 has notified Accounting 124 that the manufacturing of the goods has been completed. The receivable update or draft invoice reflects the goods that were actually manufactured by the Manufacturing department 122. TradeDoc 100 verifies that the receivable update or draft invoice from the Seller's 120 Accounting system 124 is in accordance with the matched Sales Order resulting from step 310. Again, this verification by TradeDoc 100 ensures that there are no human or systemic errors in the receivable update or draft invoice. If any errors are detected in the documentation from the Accounting System 124, they are corrected manually. Once TradeDoc 100 has verified that the data from the Accounting department 124 is correct, TradeDoc 100 generates the actual invoice that forms part of and is used to create the remainder of the documentation required to complete the trade transaction.

The invoice generated in step 350 is used by TradeDoc 100 in step 355 to automatically generate an shipping insurance instruction. The shipping insurance instruction necessarily contains the pertinent information with respect to the goods that are being sought to be insured. The insurance instruction is sent (again preferably through the Internet) to an Insurance Provider 390. The Insurance Provider 390 in turn generates and transmits back to TradeDoc 100 the documentation evidencing the shipping insurance policy on the goods to be shipped.

In step 360, all of the final export documents required for completing the trade transaction are automatically generated by TradeDoc 100 using the existing data in the TradeDoc 100 database, the invoice from step 350, the final B/L from the Freight Forwarder 250 and the insurance document from the insurance Provider 390. The final formal documents generated include, but are not limited to invoices, packing slips, B/L, insurance certificate and certificate of analysis for example. In some cases, customers will use independent certificate broker/agents to certified the goods shipped, e.g. SGS. TradeDoc 100 provides them with the list of goods from the invoice/packing slip and the inspection will provide certified message after the inspection is completed. This can be done on a electronic message or paper certificate/stamp marking.

In step 375, the documents generated in step 360, including the bill of lading or airway bill can be used by TradeDoc 100 to generate a request for receivables insurance. This request is forwarded to an insurance provider 390 which can be the same or a different insurance provider that provided the shipping insurance. In step 365, TradeDoc 100 is capable of forwarding the final documents to a broker or agent of the Seller 120 who requires advance knowledge of these documents. An example would be a local agent who is responsible for ensuring that the goods clear customs. In step 370, TradeDoc 100 generates the service charges to be applied to the Seller 120 for the services performed in generating all of the formal paperwork. In a preferred embodiment, these service charges are presented to the Seller 100 in electronic form on one of its workstations. The presentation of the service charges includes a "Pay-it" button by which the Seller 120 can click on this button and the Seller's 120 account (e.g., a Demand Deposit Account) is automatically debited for the amount of the service charges.

In some countries like Hong Kong, the local government requires any imports or exports to have a declaration be filed with the Trade Department of that country. Using all of the information already in the TradeDoc 100 database, TradeDoc 100 is able to generate such an export declaration which can then be filed with the Hong Kong Trade Department (again, preferably through electronic communication means). In addition, textile export to the United States (U.S.) requires an export quota filing. Once the interface is known, TradeDoc 100 is capable of electronically interfacing with the local government system in order to file the required export documentation required by the local government. Textile Imports into the U.S. require a U.S. visa. TradeDoc 100 can automatically generate the required documentation and interface with either the U.S. custom system or a local government system that has an interface with the US Custom system. For example, the Hong Kong Government Trade Department has a link to the U.S. Custom system to facilitate obtaining the required U.S. Visa. Some commodity exports, i.e., dairy products from Australia requires an Australian government agency to certify the product. TradeDoc 100 is capable of interfacing with the proper government agency to obtain the electronic certification. Commodity exporters are often required to provide a certificate of analysis to specify the quality/purity of the product, i.e. Aluminum. Again, TradeDoc 100 can interface with the exporter or a third party certifier in order to obtain the certificate of analysis.

The final step in the process is that all of the final export documentation is transmitted to the issuing bank to start the collection process. In the collection process, the final documentation must be presented either to the Buyer 130 directly under and Open Account transaction or to the Buyer 130's bank (the issuing bank) under an L/C transaction. One significant advantage of the present invention is that since all of the final documentation is in electronic form, the documents may be printed (using the corporate intranet described above) at the location of the bank which is closest to either the Buyer 130 or the Buyer 130's bank. This remote printing capability significantly reduces the time required for presenting the papers for collection and totally eliminates any possibility of the documentation becoming lost or otherwise mishandled. This additionally shortens the time for collection. If the customer and banks are part of the network, the documents can be posted on the Web site for retrieval by the proper parties specified on the L/C or purchase agreements.

Figure 4:
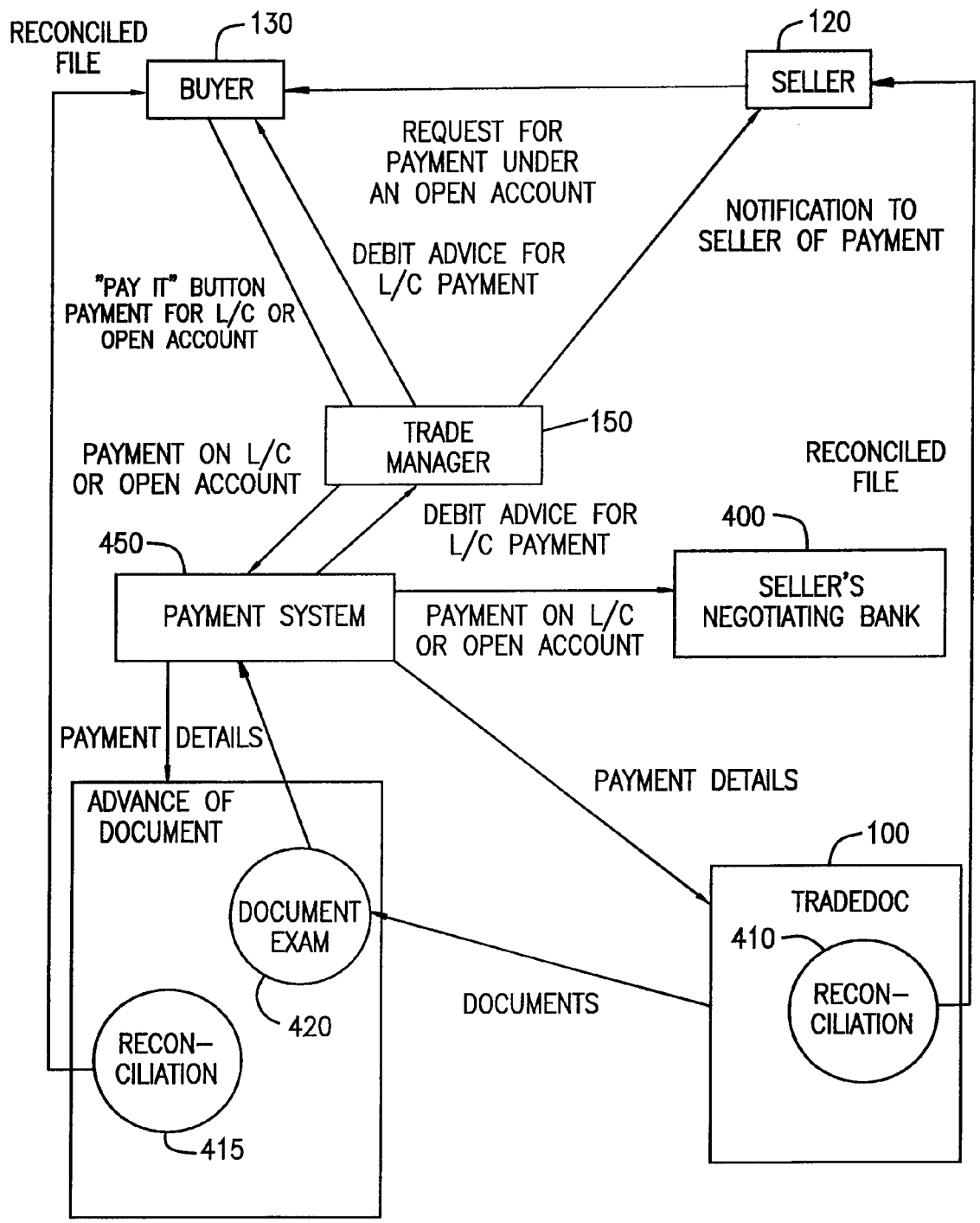
FIG. 4 depicts the payment and reconciliation functions performed by the present invention.

FIG. 4 illustrates the collection process either on an Open Account or L/C transaction. The present invention assists a Buyer 130 in managing its accounts payables and a Seller 120 in managing its receivables. On behalf of the Buyer 130 the system will match the invoice to the PO and provide an electronic file, or other format, to update the Buyer's 130 internal accounting and record keeping systems. On behalf of the Seller 120, the system will match an incoming payment from the Buyer 130 to an outstanding invoice and provide an electronic file, or other format, to update the Seller's 120 internal accounting and record keeping systems.

As illustrated in FIG. 4, TradeDoc 100 electronically transmits all of the final trade documents to the Financial System 175 for payment processing either on an Open Account or an L/C. The Financial System 175 once again validates and checks the trade documents in step 420 to ensure there are no discrepancies between the documents and the L/C or PO. If the bank operating the Financial System 175 is not the issuing bank, the trade documents are sent to issuing bank (not shown), either electronically or in printed form, which in turn notifies the Buyer 130 that payment is due. If the bank operating the Financial System 175 is the issuing bank or maintains the Open Account for the Buyer 130, the Financial System 175 notifies a Payment System 450 of the bank of the receipt of the final trade documents. The Payment System 450 in turn, transmits a debit advice for the payment on an L/C to Trade Manager 150 which forwards the advice for payment to the Buyer 130. As alternatively shown in FIG. 4, the Seller 120 can itself advise the Buyer 130 of the request for payment on an open account.

In parallel to the advice of payment, the Financial System 175 is capable, if requested by the Buyer 130, of performing a reconciliation function on behalf of the Buyer 130. The reconciliation function performed by the Financial System 175 module matches the payment under the trade documentation with the outstanding L/C or PO (under an Open Account transaction). Since an L/C may contain multiple POs and both POs and L/Cs may refer to multiple invoices this is not a trivial task. The file resulting from the reconciliation process is forwarded to the accounting system of the Buyer 130 in order to complete/update its accounts payable records.

If the bank is the issuing bank or holds the open account, the Buyer 130 provides Trade Manager 150 with an authorization for payment. In response to this authorization for payment, the Payment System 450 debits the Buyer's 130 account (e.g., DDA) and forwards the payment to the Seller 120 or its bank 400. Again, as described above with respect to the service charges to the Seller 120, when the Trade Manager 150 advises the Buyer 130 of the payment, Trade Manager 150 can incorporate a "Pay-it" button to facilitate the authorization of the payment to the Seller 120.

If the Seller 120 is customer of the bank, once payment is made by either issuing or reimbursement bank, the payment is credited to the Seller's 120 account via the Financial System 175. The Payment System 450 transmits the payment details along with any fees that have been deducted to TradeDoc 100. TradeDoc 100 performs the function of reconciling the payment with either invoice details or line items detail for the Seller 120. The reconciliation function for the Seller 120 is performed by TradeDoc 100 as opposed to the Financial System 175 because the reconciliation for the Seller 120 is performed on a line item basis. The details of the line items from the Seller's 120 invoice are preferable maintained in the TradeDoc 100 database and not in the database for the Financial System 175. Alternatively, the Financial system 175 can perform reconciliation for the Seller 120 if all of the detailed information for the reconciliation is contained in the Financial System 175 database. As with the procedure describe above with respect to the Buyer 130, TradeDoc 100 transmits the reconciled information of receivable and fees to the Seller's 120 accounting system for updating it's receivable records. As described above, since the core business of Sellers 120 is manufacturing and selling goods, the reconciliation function provided by the present invention is very desirable.

One significant advantage of the present invention is that it can be packaged and labeled (i.e., white labeled) such that the users of the system do not know who is actually operating the system. For example, the system may actually be operated by bank A, but the user interface screens can be designed such that the user believes the system is being operated by bank B. In this manner, bank B is able to present this service to its customers with a user interface consistent with its corporate image and bank A enjoys the revenues it receives from bank B for the operation of the system. Furthermore, pieces of the present invention are able to be separately licensed and operated. For example, some Sellers 120 might only want the documentary functions provided by TradeDoc 100 and not require the Financial System 175, Trade Manager 150 or TradeEDI functions.

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

What is claimed is:

1. An automated method of processing trade documents associated with a trade operation between a buyer and a seller, wherein the method is executed by a programmed computer processor which communicates with the buyer and seller via a network, the method comprising the computer-performed steps of:

maintaining a customer profile containing: (1) letter of credit templates, (2) letter of credit text, and (3) terms and conditions used that are approved for transactions involving the buyer and seller;

receiving from the buyer an initiation document containing requirement information with respect to the trade operation, wherein the initiation document is received via the network and comprises: (1) a purchase order by itself, or (2) a purchase order and an application for a letter of credit;

mapping at least some of the requirement information in a database using the computer processor to enable tracking and monitoring of the status of the trade operation;

generating a letter of credit using the computer processor if the initiation document is a purchase order and an application for a letter of credit, wherein the letter of credit is generated based on the requirement information and the customer profile;

generating at least one trade document required by the trade operation utilizing the requirement information contained in the letter of credit; and verifying the accuracy of the at least one trade document by comparing the at least one trade document to the customer profile using the computer processor.

2. The method as recited in claim 1, further comprising the step of manually repairing the Letter of Credit if there is a discrepancy between the requirement information contained in the database and the standard terms and conditions contained in the customer profile.

3. The method as recited in claim 1, further comprising the steps of:

issuing the Letter of Credit using the computer processor; and advising the seller of the issuance of the Letter of Credit.

4. The method as recited in claim 1, further comprising the step of generating a sales order using the computer processor in response to the initiation document.

5. The method as recited in claim 4, further comprising the steps of:

comparing the sales order to the requirement information contained in the database using the computer processor in order to determine any discrepancies; and correcting the sales order using the computer processor if there are any discrepancies, thereby generating a matched sales order.

6. The method as recited in claim 5, further comprising the steps of:

generating a manufacturing specification sheet based on the sales order using the computer processor;

comparing the manufacturing specification sheet to the matched sales order using the computer processor in order to determine any discrepancies; and correcting the manufacturing specification sheet using the computer processor if there are any discrepancies, thereby generating a matched manufacturing specification sheet.

7. The method as recited in claim 5, further comprising the steps of:

automatically generating shipping instructions based on the matched sales order using the computer processor; and transmitting the shipping instructions to a shipper.

8. The method as recited in claim 7, wherein the shipping instructions are a draft bill of lading.

9. The method as recited in claim 7, wherein the step of transmitting the shipping instruction to the shipper further comprises the step of electronically transmitting the shipping instructions.

10. The method as recited in claim 5, further comprising the step of generating an invoice using the computer processor.

11. The method as recited in claim 10, wherein the step of generating the invoice further comprises the step of automatically generating the invoice using the matched sales order.

12. The method as recited in claim 10, further comprising the steps of:

comparing the invoice to the matched sales order using the computer processor in order to determine any discrepancies; and correcting the invoice using the computer processor if there are any discrepancies, thereby generating a matched invoice.

13. The method as recited in claim 12, further comprising the steps of:

receiving shipping instructions from a shipper via the network;

comparing the shipping instructions to the matched invoice using the computer processor in order to determine any discrepancies; and informing the shipper of the discrepancies whereby the shipper can correct the discrepancies and provide matched shipping instructions.

14. The method as recited in claim 12, further comprising the steps of:

automatically generating shipping insurance instructions based on the matched invoice using the computer processor; and transmitting the shipping insurance instructions to an insurer.

15. The method as recited in claim 14, further comprising the steps of:

receiving a certificate of insurance from the insurer; and automatically generating at least one trade document using the certificate of insurance, the matched invoice and the matched shipping instructions.

16. The method as recited in claim 13, further comprising the step of automatically generating at least one trade document based on the matched invoice and the matched shipping instructions using the computer processor.

17. The method as recited in claim 15, wherein the trade documents include the matched invoice, the matched shipping instructions, the certificate of insurance, packing slips, and a certificate of analysis.

18. The method as recited in claim 15, further comprising the step of presenting the trade documents to the buyer for negotiation via the network.

19. The method as recited in claim 17, further comprising the step of performing a reconciliation function on behalf of the buyer using the computer processor.

20. The method as recited in claim 18, wherein the step of performing a reconciliation function on behalf of the buyer further comprises the step of reconciling a payment due under the trade documents against the requirement information.

21. The method as recited in claim 17, further comprising the steps of:

receiving payment information reflecting a payment made by the buyer, the seller via the network; and performing a reconciliation function on behalf of the seller in response to the payment information using the computer processor.

22. The method as recited in claim 20, wherein the step of performing a reconciliation function on behalf of the seller further comprises the step of reconciling the payment information against the matched invoice.

23. The method as recited in claim 22, further comprising the step printing the documents at a location which is in proximity to the bank.

24. The method as recited in claim 22, wherein the trade documents are presented to the bank electronically via the network.

* * * * *